(12) United States Patent
Tsukada et al.

(10) Patent No.: US 12,535,044 B2
(45) Date of Patent: Jan. 27, 2026

(54) FUEL INJECTION VALVE

(71) Applicant: DENSO CORPORATION, Kariya (JP)

(72) Inventors: Hideo Tsukada, Kariya (JP); Kiyotaka Yoshimaru, Kariya (JP)

(73) Assignee: DENSO CORPORATION, Kariya (JP)

( * ) Notice: Subject to any disclaimer, the term of this patent is extended or adjusted under 35 U.S.C. 154(b) by 431 days.

(21) Appl. No.: 18/083,816

(22) Filed: Dec. 19, 2022

(65) Prior Publication Data

US 2023/0124555 A1 Apr. 20, 2023

Related U.S. Application Data

(63) Continuation of application No. PCT/JP2021/025563, filed on Jul. 7, 2021.

(30) Foreign Application Priority Data

Jul. 14, 2020 (JP) ................................. 2020-120814

(51) Int. Cl.
  *F02M 61/18* (2006.01)
  *F02M 61/10* (2006.01)

(52) U.S. Cl.
  CPC ........ *F02M 61/1813* (2013.01); *F02M 61/10* (2013.01); *F02M 61/184* (2013.01); *F02M 61/1886* (2013.01)

(58) Field of Classification Search
  CPC ............. F02M 61/1813; F02M 61/184; F02M 61/1866; F02M 61/1833
  See application file for complete search history.

(56) References Cited

U.S. PATENT DOCUMENTS

| 6,142,392 A * | 11/2000 | Takeda | F02M 61/1833 239/533.14 |
| 8,657,214 B2 * | 2/2014 | Matsumura | F02M 61/1813 239/533.3 |
| 9,599,083 B2 * | 3/2017 | Ishii | F02M 61/1846 |
| 10,208,722 B2 * | 2/2019 | Kato | F02M 61/1833 |
| 10,280,887 B2 * | 5/2019 | Kato | F02M 61/1833 |
| 10,344,727 B2 * | 7/2019 | Takahashi | F02M 61/184 |
| 2004/0178287 A1 * | 9/2004 | Okamoto | F02M 61/184 239/584 |
| 2015/0285201 A1 * | 10/2015 | Serizawa | F02M 61/1846 239/584 |

(Continued)

FOREIGN PATENT DOCUMENTS

| JP | 2002-168163 | 6/2002 |
| JP | 2017-2876 | 1/2017 |

(Continued)

*Primary Examiner* — Joseph A Greenlund
(74) *Attorney, Agent, or Firm* — Nixon & Vanderhye P.C.

(57) ABSTRACT

A plurality of injection holes include at least one flat injection hole while an outlet opening of the at least one flat injection hole has a long axis and a short axis, and the at least one flat injection hole includes at least one specific flat injection hole. The specific flat injection hole has an injection hole axis that connects between a center of an inlet opening and a center of the outlet opening, and the long axis of the outlet opening is perpendicular to a plane which includes the injection hole axis and is parallel with the valve axis. An inner wall of the outlet opening has two planar portions which are opposed to each other while the long axis is interposed between the planar portions.

5 Claims, 19 Drawing Sheets

(56) References Cited

U.S. PATENT DOCUMENTS

| | | | |
|---|---|---|---|
| 2018/0202405 A1* | 7/2018 | Kato | F02M 61/184 |
| 2019/0003437 A1* | 1/2019 | Kato | F02M 61/1846 |
| 2019/0093617 A1* | 3/2019 | Niwa | F02M 61/184 |
| 2019/0277235 A1* | 9/2019 | Imai | F02M 61/1806 |
| 2021/0123403 A1 | 4/2021 | Niwa et al. | |
| 2022/0106935 A1* | 4/2022 | Kaneta | F02M 61/18 |
| 2023/0124555 A1* | 4/2023 | Tsukada | F02M 61/1813 239/584 |

FOREIGN PATENT DOCUMENTS

| | | | | |
|---|---|---|---|---|
| JP | 2017141681 A | * | 8/2017 | F02M 61/1833 |
| JP | 2018-31275 | | 3/2018 | |

* cited by examiner

FOURTH EMBODIMENT

FIFTH EMBODIMENT

NINTH EMBODIMENT

FUEL INJECTION VALVE

CROSS REFERENCE TO RELATED APPLICATIONS

This application is a continuation application of International Patent Application No. PCT/JP2021/025563 filed on Jul. 7, 2021, which designated the U.S. and claims the benefit of priority from Japanese Patent Application No. 2020-120814 filed on Jul. 14, 2020. The entire disclosures of all of the above applications are incorporated herein by reference.

TECHNICAL FIELD

The present disclosure relates to a fuel injection valve.

BACKGROUND

Previously, there has been proposed a technique for improving atomization of fuel by elaborating a shape of an injection hole of the fuel injection valve. For example, in a previously proposed fuel injection valve, a cross-section of the injection hole is made flat to reduce a surface area of an inner wall of the injection hole along which the fuel is not guided, so that accumulation of deposits on the inner wall of the injection hole is limited.

SUMMARY

This section provides a general summary of the disclosure, and is not a comprehensive disclosure of its full scope or all of its features.

According to the present disclosure, there is provided a fuel injection valve that includes a nozzle. The nozzle includes a plurality of injection holes that connect between one surface of a nozzle bottom portion, which is located on one side where a nozzle tubular portion is placed, and another surface of the nozzle bottom portion, which is located on an opposite side that is opposite to the nozzle tubular portion. Each of the plurality of injection holes has an inlet opening and an outlet opening. The plurality of injection holes include at least one flat injection hole while the outlet opening of the at least one flat injection hole has a long axis and a short axis, and the at least one flat injection hole includes at least one specific flat injection hole. The at least one specific flat injection hole has an injection hole axis that connects between a center of the inlet opening and a center of the outlet opening while the long axis of the outlet opening of the at least one specific flat injection hole is perpendicular to a plane which includes the injection hole axis and is parallel with a valve axis. An inner wall of the at least one specific flat injection hole has two planar portions which are opposed to each other while the long axis is interposed between the two planar portions.

BRIEF DESCRIPTION OF DRAWINGS

The drawings described herein are for illustrative purposes only of selected embodiments and not all possible implementations, and are not intended to limit the scope of the present disclosure.

DETAILED DESCRIPTION

Figure 1:
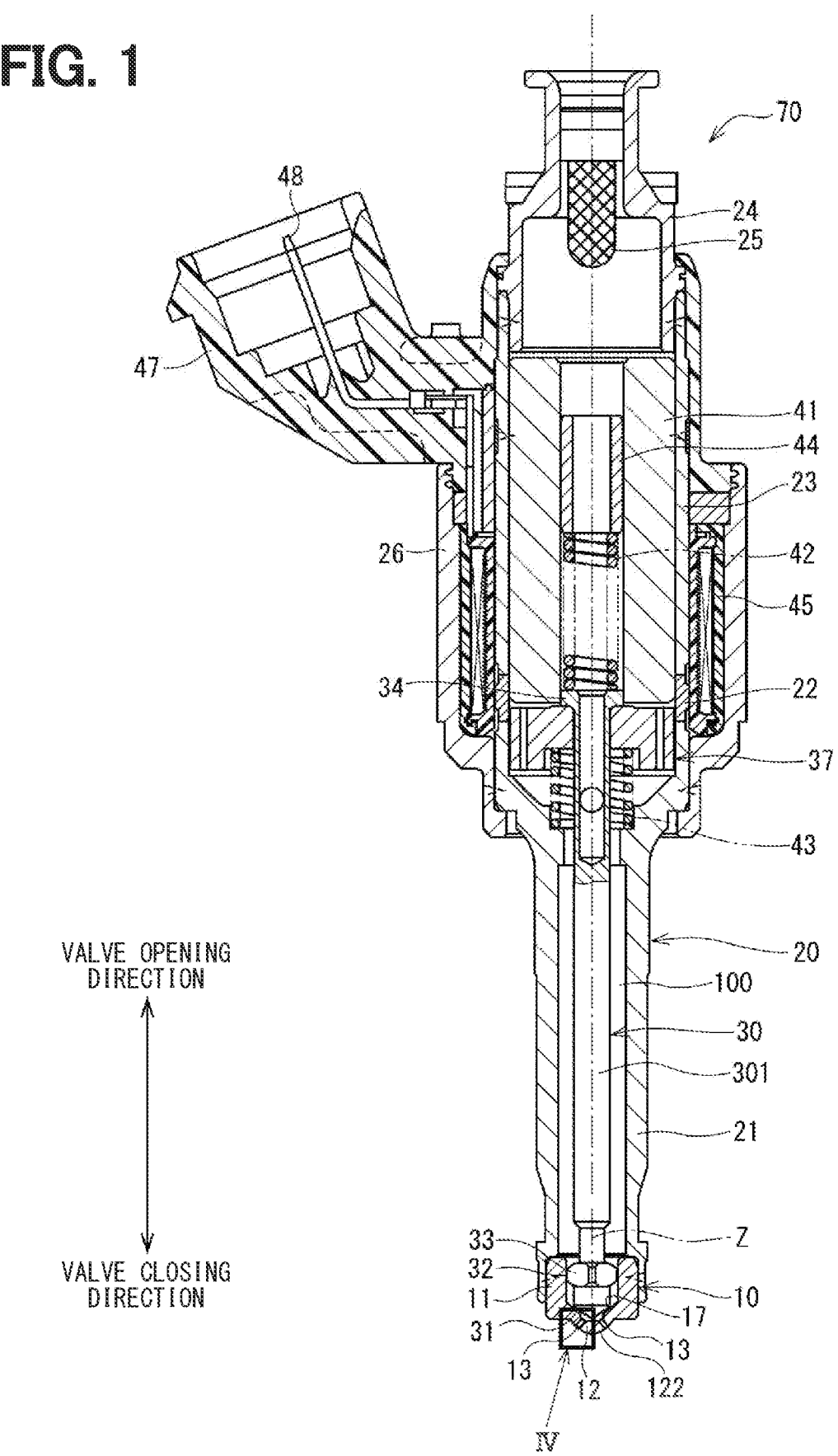
FIG. 1 is a cross-sectional view showing an overall structure of a fuel injection valve that is common to embodiments of the present disclosure.

Previously, there has been proposed a technique for improving atomization of fuel by elaborating a shape of an injection hole of the fuel injection valve. For example, in a previously proposed fuel injection valve, a cross-section of the injection hole is made flat to reduce a surface area of an inner wall of the injection hole along which the fuel is not guided, so that accumulation of deposits on the inner wall of the injection hole is limited. Also, by forming the injection hole in the flat form, thinning of a liquid film of the fuel is promoted, and atomization of the fuel and penetration reduction of the fuel spray are achieved.

In a technical field of an engine for a vehicle, a demand for a fuel injection system has been increased in recent years in response to the tightening of the regulations for PM (particulate matter) at low temperatures. As a cause of the cold time PM generation, it is understood that Wet (fuel liquid film), which is adhered to a piston surface, is not vaporized, and a luminous flame is generated at the fuel combustion time to generate the PM having large particle diameters.

In the previously proposed technique, by guiding the fuel along the inner wall of the flat injection hole, the thinning of the liquid film of the fuel is promoted, and the atomization of the fuel and the penetration reduction of the fuel spray are achieved. Although the total amount of the wall surface Wet can be reduced by the atomization of the fuel and the penetration reduction of the fuel spray, no consideration has been given to a relationship between the adhesion state of the wall surface Wet and the penetration of the fuel spray.

In addition, from a different point of view, which is different from the reduction of the total adhesion amount of the wall surface Wet by the reduction of the penetration of the fuel spray, it is thought that by quickly evaporating the fuel after adhering of the fuel to the wall, the amount of the residual fuel on the wall surface can be reduced, and thereby the generation of the luminous flame can be limited. In order to reduce the residual fuel by quickly evaporating the fuel, there is demanded an adhesion state where the wall surface Wet is thin and is wide. Therefore, it is necessary to increase the dispersibility of the fuel spray and reduce the variations in the fuel concentration and the variations in the fuel particle size.

A fuel injection valve of the present disclosure includes a nozzle, a needle and a drive device. The nozzle is centered on a valve axis and includes: a nozzle tubular portion that forms a fuel passage at an inside of the nozzle tubular portion; a nozzle bottom portion that closes one end of the nozzle tubular portion; a plurality of injection holes that connect between one surface of the nozzle bottom portion, which is located on one side where the nozzle tubular portion is placed, and another surface of the nozzle bottom portion, which is located on an opposite side that is opposite to the nozzle tubular portion, wherein the plurality of injection holes are configured to inject fuel that is received in the fuel passage; and a valve seat that is shaped in a ring form and is formed around the plurality of injection holes at the one surface of the nozzle bottom portion, which is located on the one side where the nozzle tubular portion is placed.

The needle is configured to reciprocate along the valve axis at an inside of the nozzle. The needle closes the plurality of injection holes when the needle contacts the valve seat, and the needle opens the plurality of injection holes when the needle is spaced away from the valve seat. The drive device is configured to drive the needle in a valve opening direction or a valve closing direction.

Each of the plurality of injection holes has: an inlet opening that is formed at the one surface of the nozzle bottom portion which is located on the one side where the nozzle tubular portion is placed; and an outlet opening that has a cross-sectional area larger than a cross-sectional area of the inlet opening and is formed at the another surface of the nozzle bottom portion which is located on the opposite side that is opposite to the nozzle tubular portion. The plurality of injection holes include at least one flat injection hole while the outlet opening of the at least one flat injection hole has a long axis and a short axis. The at least one flat injection hole includes at least one specific flat injection hole.

The at least one specific flat injection hole has an injection hole axis that connects between a center of the inlet opening and a center of the outlet opening while the long axis of the outlet opening of the at least one specific flat injection hole is perpendicular to a plane which includes the injection hole axis and is parallel with the valve axis. An inner wall of the at least one specific flat injection hole has two planar portions which are opposed to each other while the long axis is interposed between the two planar portions.

At a one-side wall section of the inner wall which is located on one side of the long axis and guides the fuel at a fuel injection time, a radius of curvature of a segment of one end portion of the inlet opening directed in an axial direction of the long axis is defined as a first curvature radius, and a radius of curvature of a segment of one end portion of the outlet opening directed in the axial direction of the long axis is defined as a second curvature radius, and a ratio of the second curvature radius relative to the first curvature radius is defined as a curvature radius ratio. The curvature radius ratio is in a range of 40% to 100%, more preferably a range of 50% to 90%.

According to the present disclosure, in the flat injection hole that has the outlet opening which is planar, when the curvature radius ratio of the outlet opening relative to the inlet opening is in the range of 40% to 100%, the liquid film in the injection hole for forming the fuel spray can be uniformly formed. Therefore, it is possible to implement the highly dispersed and highly homogeneous fuel spraying.

For example, the plurality of injection holes may be symmetrically arranged with respect to a reference plane, which includes the valve axis, and at least two (at least a pair of) of the plurality of injection holes, which have a largest injection hole angle among the plurality of injection holes, may be formed as the specific flat injection holes while the injection hole angle is defined as an angle of the injection hole axis relative to the valve axis.

Hereinafter, embodiments of a fuel injection valve according to the present disclosure will be described with reference to the drawings. The same reference signs are given to substantially the same portions among the embodiments, and the redundant description thereof will be omitted for the sake of simplicity. Furthermore, the first to eleventh embodiments may be collectively referred to as the present embodiment. The fuel injection valve of the present embodiment is mounted on an engine such as a gasoline engine and injects fuel into a combustion chamber of the engine.

Overall Structure of Fuel Injection Valve

Figure 21:
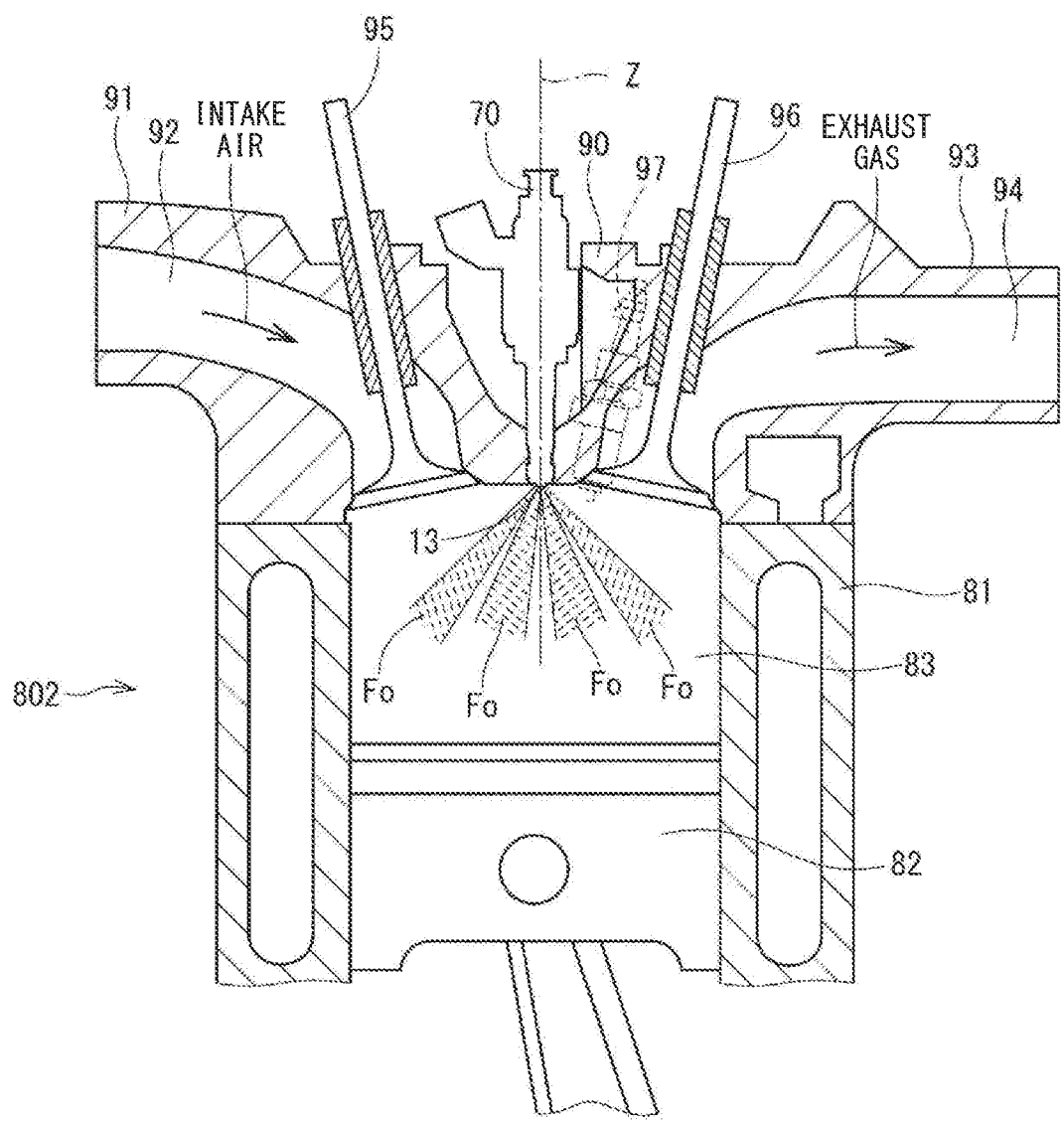
FIG. 21 is a schematic diagram showing a center-mount type engine provided with a fuel injection valve that is common to tenth and eleventh embodiments.

With reference to FIGS. 1 to 4, an overall structure of the fuel injection valve and a schematic structure of a side-mount type engine provided with the fuel injection valve common to the first and sixth to ninth embodiments will be described. A structure of a center-mount type engine provided with the fuel injection valve common to the tenth and eleventh embodiments is shown in FIG. 21. These matters are common to the previously proposed techniques of, for example, JP2017-2876A and JP2020-008013A (corresponding to US2021/0123403A), the contents of which are incorporated by reference herein in their entirety, and detailed explanations thereof are omitted as appropriate.

Figure 2:
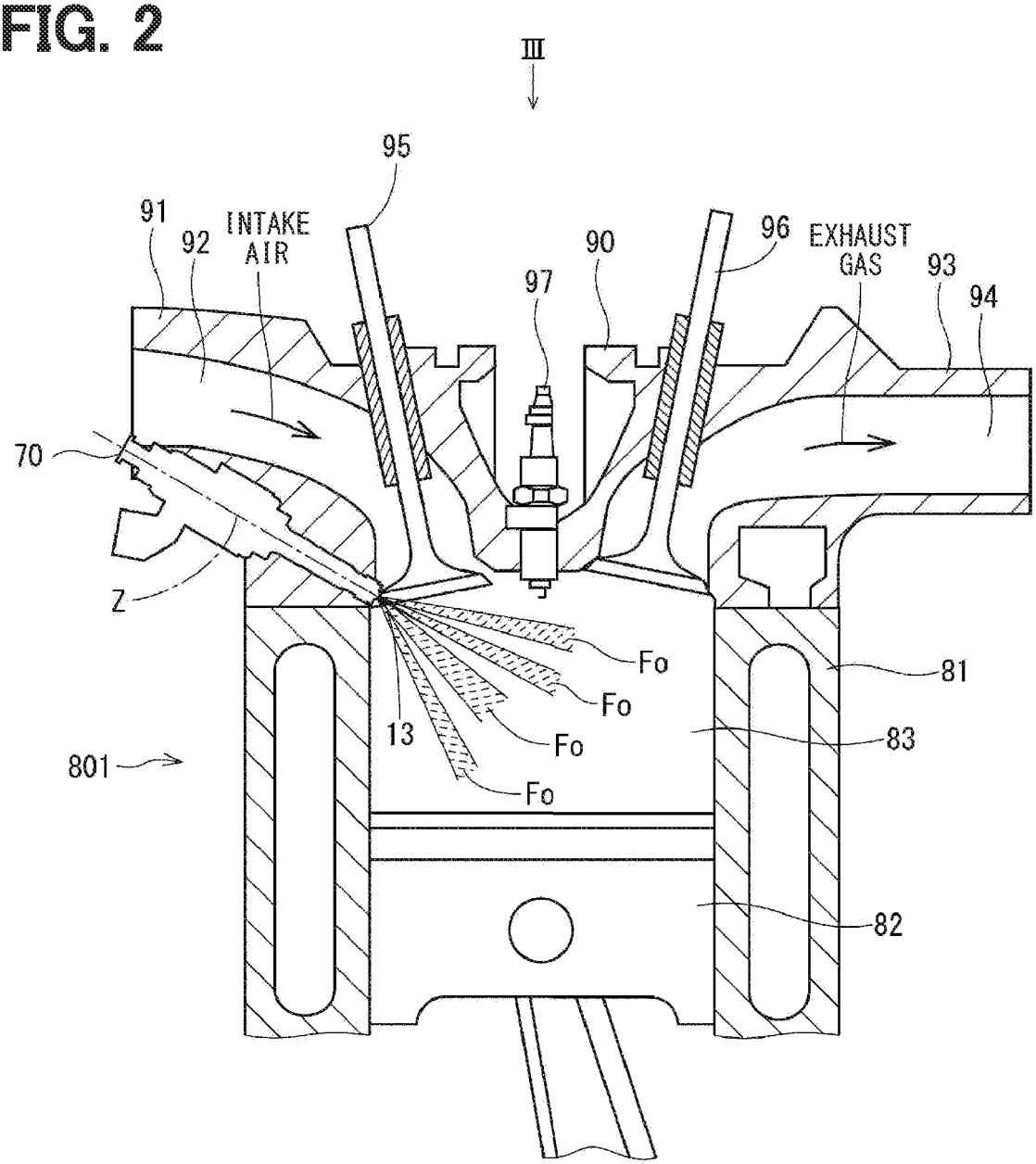
FIG. 2 is a schematic diagram showing a side-mount type engine provided with the fuel injection valve that is common to first and six to ninth embodiments.
Figure 3:
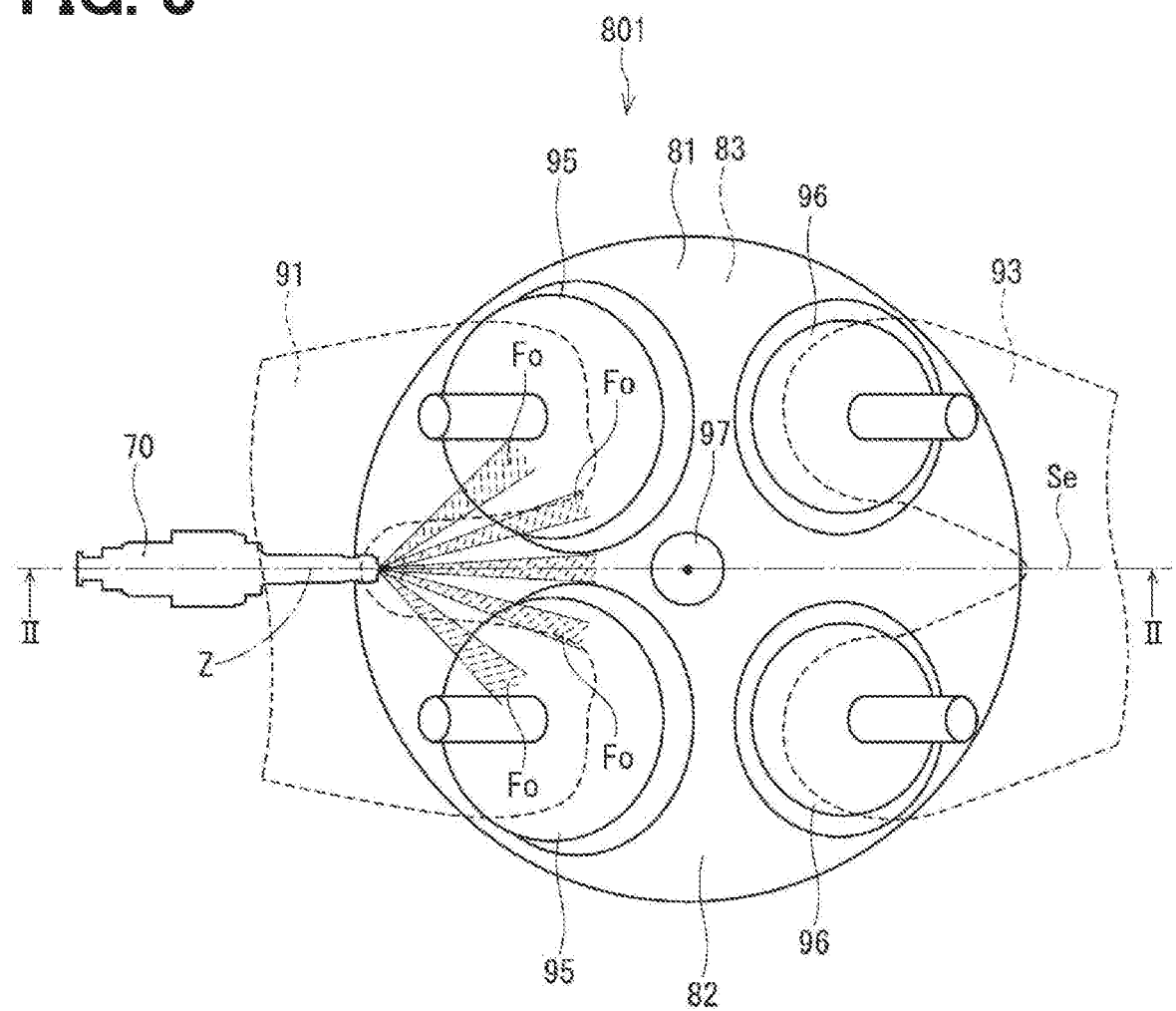
FIG. 3 is a view taken in a direction of an arrow III in FIG. 2.

The side-mount type engine 801 shown in FIGS. 2 and 3 includes a cylinder block 81, a piston 82, a cylinder head 90, two intake valves 95 and two exhaust valves 96. A combustion chamber 83 is defined by an inner wall of the cylinder block 81, a wall surface of the cylinder head 90 and the piston 82. A volume of the combustion chamber 83 is increased and decreased in response to reciprocation of the piston 82.

The cylinder head 90 includes an intake manifold 91 and an exhaust manifold 93. An intake air passage 92, which conducts the intake air to the combustion chamber 83, is formed at the intake manifold 91. An exhaust passage 94, which conducts the exhaust gas generated in the combustion chamber 83 to the atmosphere, is formed at the exhaust manifold 93. Each intake valve 95 is configured to open and close a connection between the combustion chamber 83 and the intake air passage 92. Each exhaust valve 96 is configured to open and close a connection between the combustion chamber 83 and the exhaust passage 94.

In the side-mount type engine 801, the fuel injection valve 70 is installed on the cylinder block 81 side of the intake air passage 92, i.e., on the lateral side of the combustion chamber 83 such that the fuel injection valve 70 is tilted. Furthermore, a spark plug 97 is installed at a portion of the cylinder head 90 located between the intake valves 95 and the exhaust valves 96, i.e., a location that corresponds to the center of the combustion chamber 83. The spark plug 97 is installed at the location where the fuel injected from the fuel injection valve 70 is not directly adhered and where the mixture gas of the fuel and the intake air can be ignited. Thus, the engine 801 is a direct-injection gasoline engine.

The fuel injection valve 70 is installed such that a plurality of injection holes 13 are exposed to a radially outer portion of the combustion chamber 83. The fuel, which is pressurized by a fuel pump (not shown), is supplied to the fuel injection valve 70. A conical fuel spray Fo is injected from each of the injection holes 13 of the fuel injection valve 70 into the combustion chamber 83.

The engine 801 is provided with the two intake valves 95 and the two exhaust valves 96. The two intake valves 95 are provided at two end portions, respectively, of the intake manifold 91, which are branched and are located at the cylinder block 81 side. The two exhaust valves 96 are provided at two end portions, respectively, of the exhaust manifold 93, which are branched and are located at the cylinder block 81 side. The fuel injection valve 70 is installed such that a valve axis Z of the fuel injection valve 70 extends along a center cross-section Se while the center cross-section Se includes an axis of the cylinder block 81 and is located between the two intake valves 95 and the two exhaust valves 96.

Next, a basic structure of the fuel injection valve 70 will be described with reference to FIG. 1. The fuel injection valve 70 includes a nozzle 10, a housing 20, a needle 30, a movable core 37, a stationary core 41, a coil 45 and springs 42, 43. The movable core 37, the stationary core 41 and the coil 45 function as a drive device that is configured to drive the needle 30 in a valve opening direction away from the injection holes 13 or a valve closing direction toward the injection holes 13.

The nozzle 10 is centered on the valve axis Z and includes a nozzle tubular portion 11, a nozzle bottom portion 12, a plurality of injection holes 13 and a valve seat 17. The nozzle tubular portion 11, which is shaped generally in a cylindrical tubular form, forms a fuel passage 100 at an inside of the nozzle tubular portion 11. The nozzle bottom portion 12 closes one end of the nozzle tubular portion 11. The injection holes 13, which are formed at the nozzle bottom portion 12, are configured to inject the fuel received in the fuel passage 100. The valve seat 17 is shaped in a ring form and is formed around the injection holes 13 at one surface of the nozzle bottom portion 12, which is located on the one side (also referred to as a nozzle tubular portion 11 side) where the nozzle tubular portion 11 is placed. The injection holes 13 will be described in detail later.

The housing 20 includes a first tubular member 21, a second tubular member 22, a third tubular member 23 and an inlet 24. The first tubular member 21, the second tubular member 22 and the third tubular member 23 are respectively shaped generally in a cylindrical tubular form. The first tubular member 21, the second tubular member 22 and the third tubular member 23 are coaxially arranged in this order and are joined together. One end of the inlet 24 is connected to an end portion of the third tubular member 23, and the other end of the inlet 24 is connected to a pipe (not shown). A filter 25, which collects foreign objects contained in the fuel, is installed at an inside of the inlet 24.

The fuel passage 100 is formed at an inside of the housing 20. The fuel, which is supplied from the inlet 24, flows through the fuel passage 100 and the inside of the nozzle tubular portion 11 and is injected from the injection holes 13. A pressure of the fuel in the fuel passage 100 at the time of operating the fuel injection valve 70 of the present embodiment is, for example, about 20 MPa.

The needle 30 is configured to reciprocate along the valve axis Z at an inside of the nozzle 10. The needle 30 includes a needle main body 301, a seat portion 31, a large diameter portion 32 and a flange 34. The seat portion 31 is formed at an end portion of the needle main body 301, which is located on the nozzle 10 side, and the seat portion 31 is configured to contact the valve seat 17.

The large diameter portion 32 is formed near the seat portion 31 which is formed at the end portion of the needle main body 301 located on the valve seat 17 side. An outer diameter of the large diameter portion 32 is set to be larger than an outer diameter of the end portion of the needle main body 301 located on the valve seat 17 side. The large diameter portion 32 is configured such that an outer wall of the large diameter portion 32 slides along an inner wall of the nozzle tubular portion 11 of the nozzle 10. The fuel can flow through a plurality of cutouts 33 which are circumferentially arranged at an outer wall of the large diameter portion 32. The flange 34 projects radially outward from an end portion of the needle main body 301 which is opposite to the seat portion 31.

When the seat portion 31 contacts the valve seat 17, the needle 30 closes the injection holes 13. In contrast, when the seat portion 31 is spaced away from the valve seat 17, the needle 30 opens the injection holes 13. Hereinafter, a direction of moving the needle 30 away from the valve seat 17 is defined as a valve opening direction, and a direction of moving the needle 30 toward the valve seat 17 is defined as a valve closing direction.

The movable core 37 is shaped generally in a cylindrical tubular form and is made of a magnetic material, such as ferritic stainless steel processed through a magnetic stabilization process. The movable core 37 is movable in the axial direction relative to the needle main body 301 at the inside of the first tubular member 21 and the second tubular member 22 of the housing 20.

The stationary core 41 is shaped generally in a cylindrical tubular form and is made of a magnetic material, such as ferritic stainless steel processed through the magnetic stabilization process. The stationary core 41 is installed at the inside of the second tubular member 22 and the third tubular member 23 of the housing 20 at a location that is on the inlet 24 side of the movable core 37.

An adjusting pipe 44, which is shaped in a cylindrical tubular form, is press-fitted at an inside of the stationary core 41. The spring 42 is, for example, a coil spring, and is installed between the adjusting pipe 54 at the inside of the stationary core 41 and the flange 34 of the needle 30. The spring 42 urges the movable core 37 together with the needle 30 in the valve closing direction.

The coil 45 is shaped generally in a cylindrical form and is installed such that the coil 45 surrounds an outer peripheral side of, particularly, the second tubular member 22 and the third tubular member 23 of the housing 20. A holder 26, which is shaped in a tubular form, is installed on a radially outer side of the coil 45 such that the holder 26 covers the coil 45.

When the coil 45 is energized from an external control device through terminals 48 of a connector portion 47, a magnetic circuit is formed through the movable core 37, the first tubular member 21, the holder 26, the third tubular member 23 and the stationary core 41 while bypassing the second tubular member 22 that is a magnetic restrictor. Therefore, a magnetic attractive force is generated between the stationary core 41 and the movable core 37, and thereby the movable core 37 together with the needle 30 is magnetically attracted toward the stationary core 41. Thus, the needle 30 is moved in the valve opening direction, and thereby the seat portion 31 is spaced away from the valve seat 17 to implement the valve opening. As a result, the injection holes 13 are opened, and the fuel is injected from the injection holes 13. As discussed above, when the coil 45 is energized, the movable core 37 is magnetically attracted towards the stationary core 41 to move the needle 30 in the valve opening direction.

When the energization of the coil 45 is stopped in the state where the movable core 37 is magnetically attracted to the stationary core 41, the needle 30 and the movable core 37 are urged by an urging force of the spring 42 toward the valve seat 17. Thus, the needle 30 is moved in the valve closing direction, and thereby the seat portion 31 contacts the valve seat 17 to implement the valve closing. Therefore, the injection holes 13 are closed.

The spring 43 is, for example, a coil spring and urges the movable core 37 toward the stationary core 41, i.e., in the valve opening direction. An urging force of the spring 43 is smaller than the urging force of the spring 42. Therefore, when the coil 45 is not energized, the seat portion 31 of the needle 30 is urged against the valve seat 17 by the spring 42 to place the needle 30 in the valve closing state.

The fuel, which is supplied from the inlet 24, flows through the inside of the stationary core 41, the inside of the adjusting pipe 54 and the fuel passage 100 formed between the needle 30 and the inner walls of the housing 20 and the nozzle tubular portion 11 and is guided to the injection holes 13. Since the space, which is located around the movable core 37 and the needle 30, is filled with the fuel at the time of operating the fuel injection valve 70, the movable core 37 and the needle 30 can smoothly reciprocate in the axial direction at the inside of the housing 20.

Figure 4:
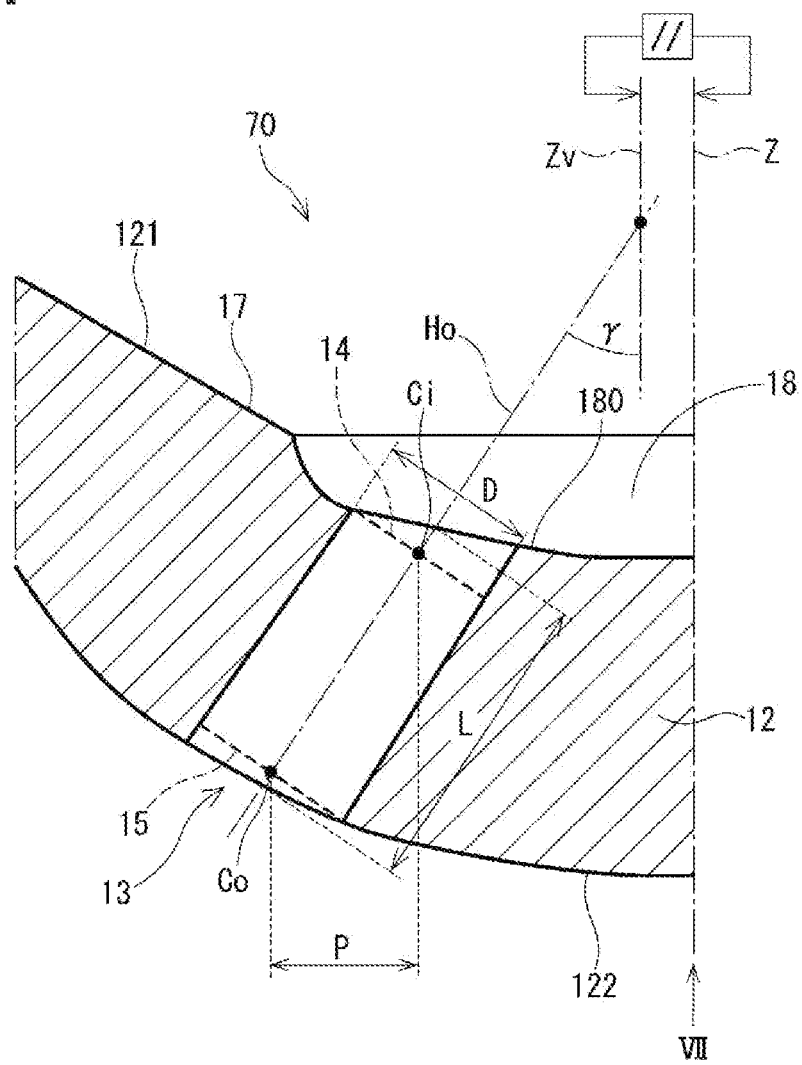
FIG. 4 is an enlarged cross-sectional view of a portion IV in FIG. 1 (an axial cross-sectional view of an injection hole).
Figure 5:
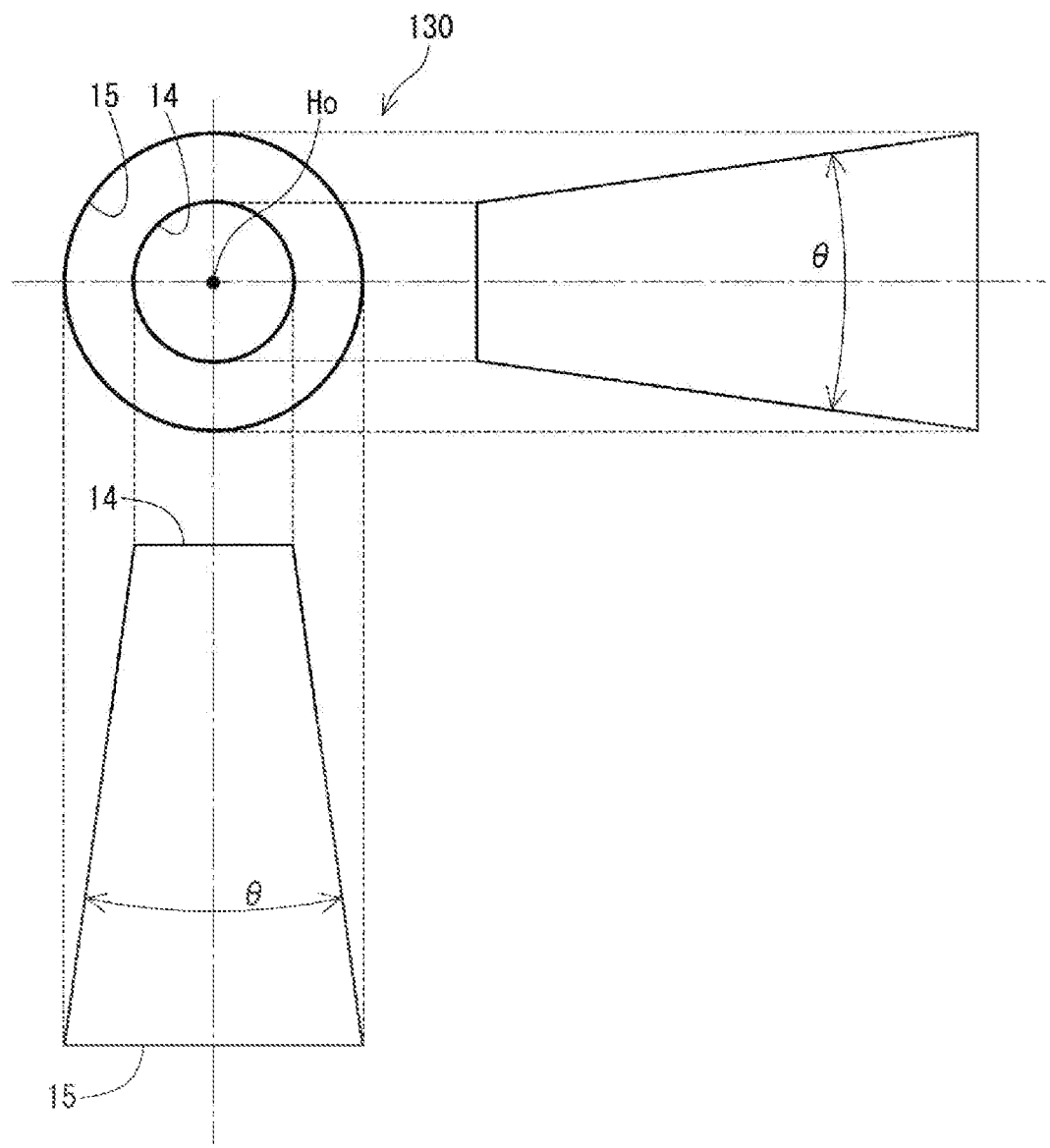
FIG. 5 is a schematic three-sided view showing a shape of an injection hole (a tapered injection hole) of a comparative example.

FIG. 4 indicates an axial cross-section of the injection hole 13 that corresponds to an enlarged view of a portion IV in FIG. 1. In FIG. 4, indication of the needle 30 is omitted for the sake of simplicity. The nozzle 10 has the valve seat 17 and a sac wall surface 180 at one surface 121 of the nozzle bottom portion 12 which is located on the nozzle tubular portion 11 side.

The valve seat 17 is shaped in a ring form and is formed around the sac wall surface 180. The valve seat 17 is tapered such that the valve seat 17 progressively approaches the valve axis Z in a direction that is directed from the nozzle tubular portion 11 toward the sac wall surface 180. The sac wall surface 180 is recessed at a center portion of the one surface 121 of the nozzle bottom portion 12, which is located on the nozzle tubular portion 11 side, toward the opposite side that is opposite to the nozzle tubular portion 11, and thereby the sac wall surface 180 forms a sac chamber 18 at the inside thereof. The sac chamber 18 is formed between the sac wall surface 180 and the seat portion 31 of the needle 30.

Each of the injection holes 13 connects between the sac wall surface 180 at the one surface 121 of the nozzle bottom portion 12, which is located on the nozzle tubular portion 11 side, and another surface 122 of the nozzle bottom portion 12, which is located on an opposite side that is opposite to the nozzle tubular portion 11. The injection holes 13 are configured to inject the fuel received in the fuel passage 100. The other surface 122 of the nozzle bottom portion 12, which is located on the opposite side that is opposite to the nozzle tubular portion 11, and the sac wall surface 180 are formed as curved surfaces, respectively.

Each of the injection holes 13 has: an inlet opening 14 that is formed at the sac wall surface 180 (i.e., the one surface 121 of the nozzle bottom portion 12 which is located on the one side where the nozzle tubular portion 11 is placed); and an outlet opening 15 that is formed at the other surface 122 of the nozzle bottom portion 12 which is located on the opposite side that is opposite to the nozzle tubular portion 11. A cross-sectional area of the outlet opening 15 is larger than a cross-sectional area of the inlet opening 14.

A straight line, which connects between a center Ci of the inlet opening 14 and a center Co of the outlet opening 15, is defined as an injection hole axis Ho. The injection hole axis Ho does not necessarily intersect the valve axis Z. Therefore, there is assumed an imaginary axis Zv, which intersects the injection hole axis Ho and is parallel with the valve axis Z, and an angle of the injection hole axis Ho relative to the imaginary axis Zv is defined as an injection hole angle γ. In a view taken in a direction of an arrow VII in FIG. 4 (i.e., the view taken in the axial direction of the valve axis Z), a distance between the center Ci of the inlet opening 14 and the center Co of the outlet opening 15 is defined as a projected center-to-center distance P. As long as an injection hole length L is constant, when the projected center-to-center distance P is increased, the injection hole angle γ is increased.

Furthermore, it is assumed that the inlet opening 14 is shaped in a circle, and a diameter of the inlet opening 14 is denoted by D. A ratio (L/D) between the injection hole length L and the inlet opening diameter D is set in a range of 2.0 to 3.0. When the ratio (L/D) is smaller than 2.0, the injection direction is not stabilized. Furthermore, when the ratio (L/D) is larger than 3.0, a velocity of the fuel in the injection direction is reduced due to friction between the fuel and the inner wall of the injection hole. Thereby, in such a case, atomization performance for atomizing the fuel is deteriorated.

The summary description of the fuel injection valve 70 and the injection holes 13 have been made above. Approaches for reducing the wall surface Wet (fuel liquid film), which causes the cold time particulate matter (PM) generation at the engine includes: (1) reducing the adhered fuel amount; and (2) increasing the amount of evaporated fuel after the adhesion of the fuel. In the past, efforts have focused on (1) the reducing of the adhered fuel amount, and there have been elaborated various injection hole shapes to implement penetration reduction of the fuel spray. In contrast, the present embodiment focuses on (2) the increasing of the amount of evaporated fuel after the adhesion of the fuel to the wall surface and proposes a suitable injection hole shape for achieving the atomization and the wide-angle injection by implementing highly dispersed and highly homogeneous fuel spraying.

From the viewpoint of spreading the fuel spray angle, it is effective to increase the spreading speed of the fuel spray. In terms of achieving the high atomization, attention is focused on the thinning of the fuel film since the volume average particle size is proportional to ⅓ (one-third) power of the liquid film thickness according to Fraser's equation for liquid film breakup disclosed in JP2002-168163A. Therefore, in the present embodiment, the injection hole shape of the fuel injection valve is defined so as to increase the spreading speed of the fuel spray and thin the fuel film.

Hereafter, an injection hole, which has a shape satisfying a favorable condition in the present embodiment, is defined as a specific flat injection hole. Among flat injection holes, each of which has an outlet opening that has a long axis and a short axis, one or more of the flat injection holes, which satisfy specific requirements described later, are referred to as the specific flat injection hole(s). In the fuel injection valve 70 of the present embodiment, one or more of the injection holes 13 are formed as the specific flat injection hole(s), or all of the injection holes 13 are formed as the specific flat injection holes. Next, a structure of the fuel injection valve 70, which achieves the above objective, will be described for each of the embodiments.

The structure of each of the embodiments is defined by a combination of the arrangement of the injection holes and a shape of each specific flat injection hole. For the specific flat injection holes of various shapes according to the first to fifth embodiments, a reference sign of the specific injection hole is indicated by adding the number of the subject embodiment as a third digit following "13." For the fuel injection valves having the various injection hole arrangements according to the first, and sixth to eleventh embodiments, a reference sign of the injection hole is indicated by adding the number of the subject embodiment as a third digit following "70."

First Embodiment

The structure, the actions and the effects of the fuel injection valve 701 of the first embodiment will be described with reference to FIGS. 5 to 12. The flat injection hole, which is a superordinate concept of the specific flat injection hole, refers to an injection hole that has an outlet opening that is not shaped in a form of a circle but is shaped in a flat form (elongated form), which has a long axis and a short axis. In general, various possible shapes of the outlet opening of the flat injection hole may include, for example, an ellipse shape, an oval shape and an oblong shape disclosed in JP2020-008013A (corresponding to US2021/0123403A). Among them, the outlet opening 15 of the flat injection hole 131 of the first embodiment has the oblong shape, specifically a stadium shape (rounded rectangle shape), and the injection hole having this shape is referred to as a stadium-shaped injection hole in this specification.

The antonym of the flat injection hole is a circular injection hole having an outlet opening shaped in a circle, or a tapered injection hole shaped in a circular cone and having an inlet opening and an outlet opening which are coaxial with each other. The tapered injection hole 130 of a comparative example and the flat injection hole 131 of the first embodiment will be described with reference to FIGS. 5 and 6. In the tapered injection hole 130 of FIG. 5, the inlet opening 14 and the outlet opening 15 are both shaped in the circle and are coaxial with each other. In a cross-section of the injection hole 130 which includes the injection hole axis Ho, a spreading angle θ of an inner wall of the injection hole 130 is constant in a circumferential direction.

Figure 6:
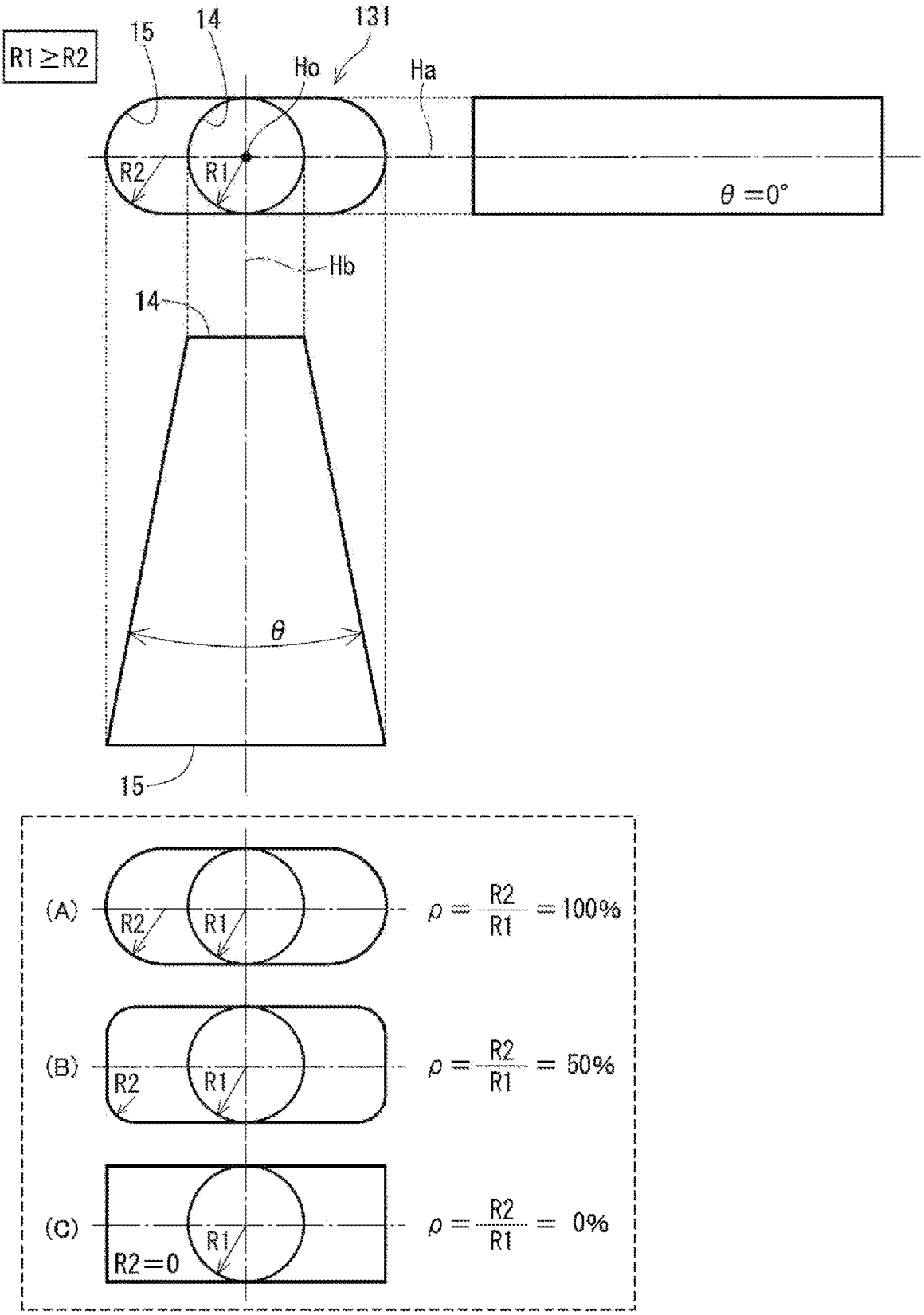
FIG. 6 is a schematic three-sided view showing a shape of an injection hole (a flat injection hole) of the embodiment.

FIG. 6 shows the flat injection hole, more specifically, the stadium-shaped injection hole that has the outlet opening 15 which is in the stadium shape (rounded rectangle shape). In general, examples of the shape of the outlet opening of the flat injection hole may also include, for example, an ellipse injection hole having the outlet opening in an ellipse shape, an oval injection hole in an oval shape besides the stadium-shaped injection hole having the outlet opening in the oblong shape. The inlet opening 14 of the flat injection hole 131, which is the stadium-shaped injection hole, is shaped in a circle that has a radius R1. The outlet opening 15 of the flat injection hole 131 has the long axis Ha and the short axis Hb. Two arcuate segments, which have the radius R2 and are respectively formed at two opposite ends of the outlet opening 15 directed opposite to each other in the axial direction of the long axis Ha, are joined together by two straight segments which are parallel to each other.

In the cross-section along the long axis Ha, two portions of the inner wall, which are opposed to each other and extend in the axial direction of the short axis, are spread away from each other by a spreading angle θ in a direction that is directed from the inlet opening 14 toward the outlet opening 15. In contrast, in a cross-section along the short axis Hb, a distance between two portions of the inner wall, which are opposed to each other and extend in the axial direction of the long axis, is constant. In other words, the spreading angle θ of the two portions of the inner wall, which are opposed to each other and extend in the axial direction of the long axis, is set to 0°. This is also a specification required in view of a workability in a laser processing of the injection hole.

In this description, a radius R1 of the inlet opening 14 is generalized as a radius of curvature of a curve, which is other than a circle, and this radius R1 is referred to as a first curvature radius R1. A radius of curvature R2 of an arcuate segment of each of the two opposite end portions of the outlet opening 15, which are directed opposite to each other in the axial direction of the long axis, is defined as a second curvature radius R2. A ratio of the second curvature radius R2 relative to the first curvature radius R1 is defined as a curvature radius ratio ρ (=R2/R1). As examples of the curvature radius ratio ρ, the lower side of FIG. 6 indicates shape examples of (A) ρ=100%, (B) ρ=50% and (C) ρ=0%.

Figure 7:
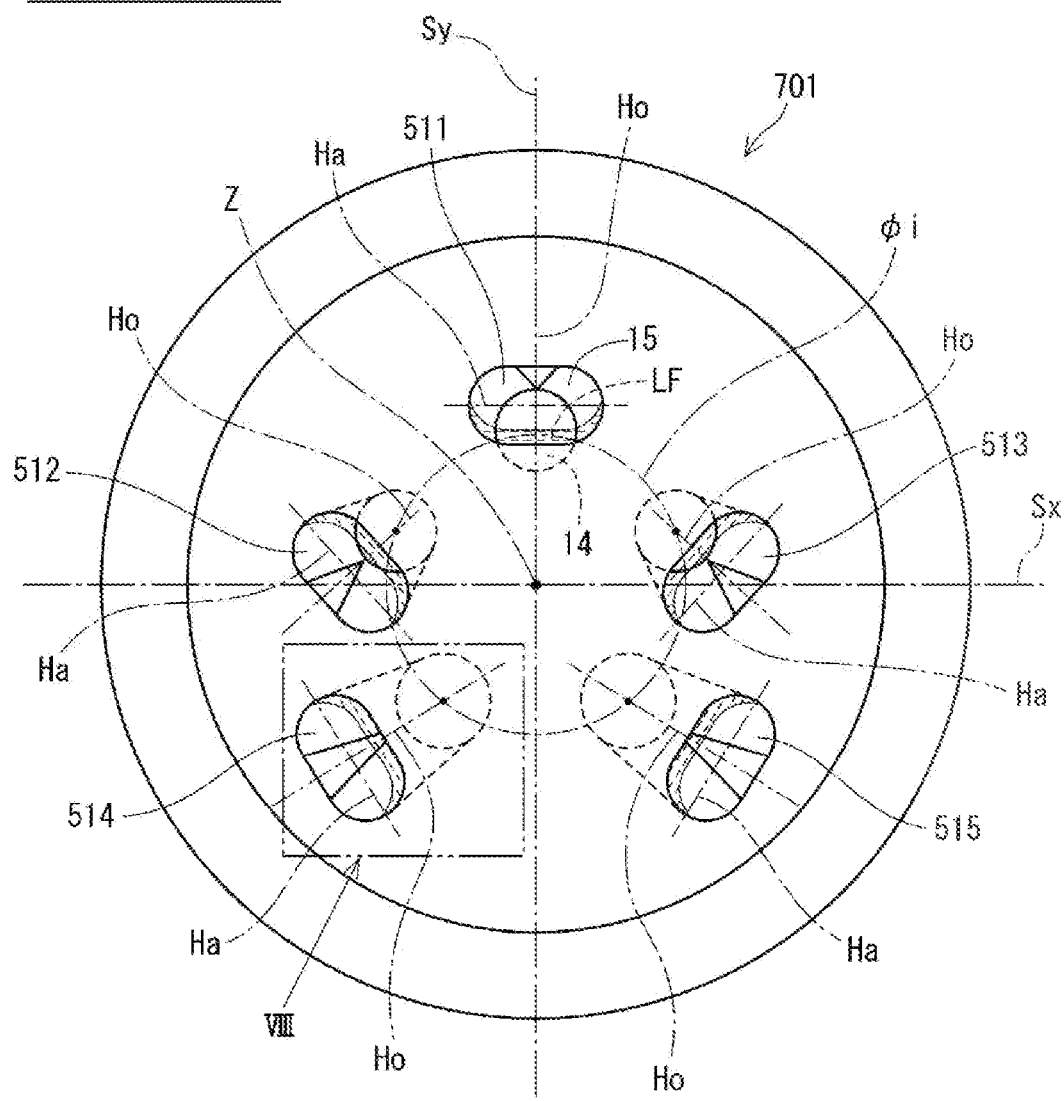
FIG. 7 is a schematic diagram showing an arrangement of the injection holes (five holes) of the fuel injection valve according to the first embodiment.

Next, with reference to FIG. 7, an arrangement of the injection holes (hereinafter also referred to as an injection hole arrangement) of the fuel injection valve 701 of the first embodiment seen in a direction of an arrow VII in FIG. 4 will be described. As shown in FIG. 7, the fuel injection valve 701 of the first embodiment has five specific flat injection holes 511-515 arranged around the valve axis Z. In the fuel injection valve of the side-mount type, an axial direction of each injection hole axis Ho is directed toward one side (the lower side of the drawing) with respect to the valve axis Z.

In the drawings for explaining the injection hole arrangement, in order to distinguish each injection hole by its position, a reference sign, which is different from the general reference sign 131 for the injection holes of the first embodiment, is used. For example, a reference sign 511 indicates a first injection hole of a first pattern of a five hole design. Furthermore, for example, a reference sign 634 of FIG. 23 indicates a fourth injection hole of a third pattern of a six hole design. Here, it should be noted that "first" and "fourth" discussed above are the numbers used for the sake of convenience in the description.

Figure 8:
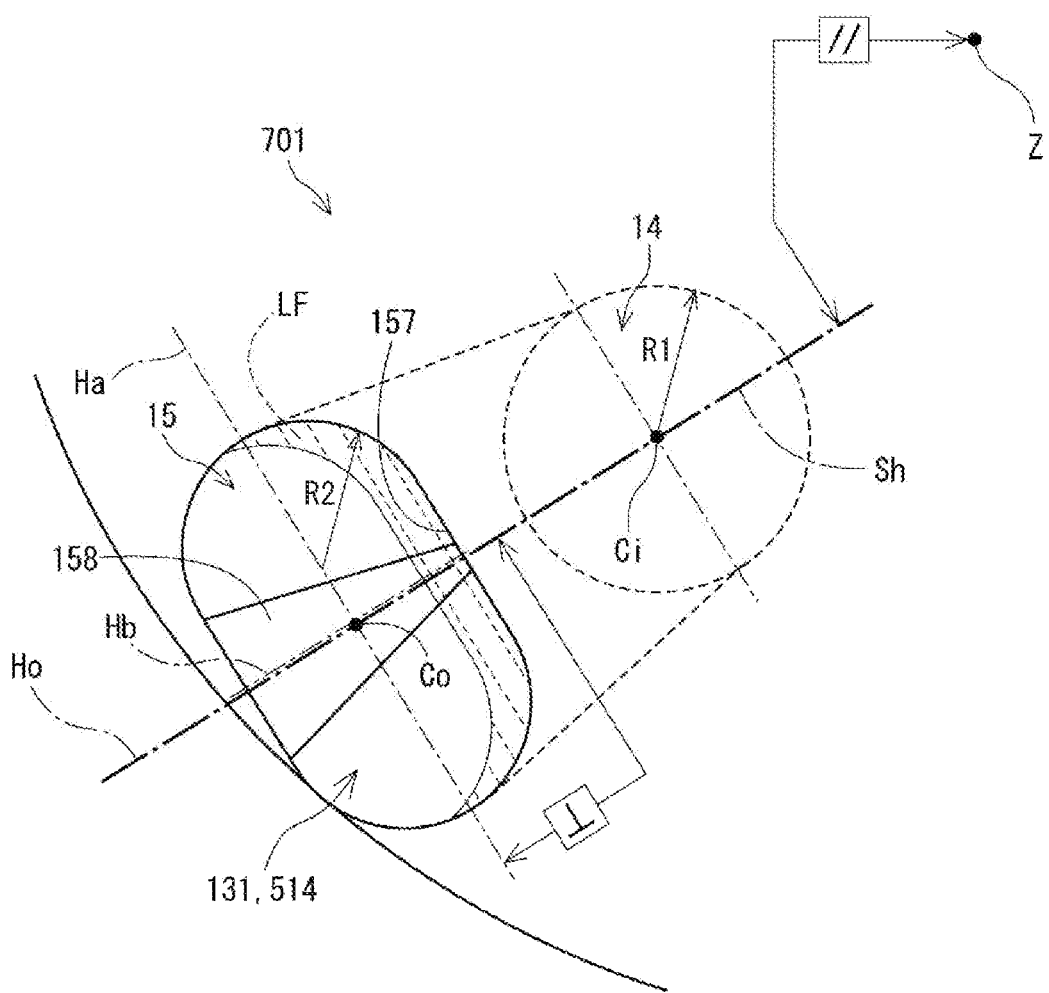
FIG. 8 is an enlarged view of a portion VIII in FIG. 7.

In this description, the general reference sign, such as 131, is used in a case where shapes of respective parts of the injection hole are described focusing on one specific flat injection hole, and the identification reference signs, such as 511-515, are used in a case where the arrangement of the injection holes at the entire nozzle bottom portion 12 is described. In FIG. 7, the injection hole axis Ho and the long axis Ha are indicated for each of the five specific flat injection holes 511-515. The short axis Hb overlaps the injection hole axis Ho. Among the five specific flat injection holes 511-515, an enlarged view of the fourth injection hole 514 is indicated in FIG. 8 as a representative view of the specific flat injection hole 131 of the first embodiment.

In FIG. 7, a plane, which includes the valve axis Z and is indicated by a dot-dash line extending in the up-to-down direction, is defined as a reference plane Sy, and another plane, which includes the valve axis Z and is indicated by a dot-dash line extending in the left-to-right direction, is defined as a reference orthogonal plane Sx. Among the five specific flat injection holes 511-515, the first injection hole 511 is placed on the reference plane Sy. Furthermore, the second and third injection holes 512, 513 are symmetrically arranged with respect to the reference plane Sy, and the fourth and fifth injection holes 514, 515 are symmetrically arranged with respect to the reference plane Sy. The second and third injection holes 512, 513 and the fourth and fifth injection holes 514, 515 are respectively arranged such that the long axis Ha thereof is progressively spaced from the reference plane Sy in a direction that is directed from an opposite side of the first injection hole 511 toward the first injection hole 511.

The purpose of this injection hole arrangement is to improve a fuel spray occupancy in a target cylinder interior space by using a Coanda effect generated between each adjacent two of the fuel sprays respectively injected from the injection holes 511-515. Specifically, in the space, which is surrounded by the first, second and third injection holes 511, 512, 513, a negative pressure is generated in a closed space formed among the three adjacent fuel sprays respectively injected from the first, second and third injection holes 511, 512, 513, and this negative pressure causes a fuel spray interference. In contrast, between two fuel sprays, which are adjacent to each other, even when the fuel spray interference occurs, the closed space is not generated. Therefore, in order to avoid the fuel spray interference among the three fuel sprays, the Coanda effect between the two fuel sprays is utilized, and the injection hole arrangement is set such that the more active interference is generated between the two fuel sprays in comparison to the interference among the three fuel sprays.

A center of the inlet opening 14 of each injection hole 511-515 is located on a concentric circle φi that is centered on the valve axis Z. Although not directly indicated in FIG. 7, the injection hole angle γ of each injection hole 511-515 correlates with the projected center-to-center distance P (see FIG. 4). Therefore, the injection hole angle γ of the first injection hole 511 is the smallest, and the injection hole angles γ of the second and third injection holes 512, 513 are the next smallest. Furthermore, the injection hole angles γ of the fourth and fifth injection holes 514, 515 are the largest.

The requirements of the specific flat injection hole will be described with reference FIG. 8 by using the fourth injection hole 514 as an example. On the premise that the specific flat injection hole 131 is the flat injection hole having the long axis Ha and the short axis Hb, the specific flat injection hole 131 has three additional requirements.

As the first requirement, the long axis Ha of the specific flat injection hole 131 is perpendicular to a plane Sh that includes the injection hole axis Ho and is parallel with the valve axis. The plane Sh is a plane that is perpendicular to the plane of each of FIGS. 7 and 8. As the second requirement, the specific flat injection hole 131 has two planar portions 157, 158 which are formed at the inner wall and are opposed to each other while the long axis Ha is interposed between the planar portions 157, 158. In FIG. 8, a region, which is held between two straight lines, indicates the planar portion. The straight lines, which indicate the boundaries of the planar portion, are indicated only at some of the injection holes in the corresponding respective drawings.

A liquid film LF is indicated on a wall section (hereinafter referred to as a one-side wall section) of the inner wall which is located on the planar portion 157 side of the long axis Ha, and the liquid film LF is not indicated on another wall section (hereinafter referred to as an other-side wall section) of the inner wall which is located on the planar portion 158 side of the long axis Ha. As will be described with reference to FIG. 9, the liquid film LF is the fuel that is guided along the inner wall at the fuel injection time. At the injection hole arrangement shown in FIG. 7, in each of the first injection hole 511 and the fourth and fifth injection holes 514, 515 that respectively have the injection hole axis Ho tilted in the radially outer direction of the valve axis Z, a wall section of the inner wall, which is located on the valve axis Z side, serves as the one-side wall section of the inner wall which guides the fuel at the fuel injection time. Furthermore, in each of the second and third injection holes 512, 513 that respectively have the injection hole axis Ho tilted in a direction away from the reference plane Sy, a wall section of the inner wall, which is located on the reference plane Sy side of the long axis Ha, serves as the one-side wall section of the inner wall which guides the fuel at the fuel injection time.

The third requirement of the specific flat injection hole is that the curvature radius ratio ρ is in a range of 40% to 100%. Here, the range of 40% to 100% should be interpreted as a range that is equal to or larger than 40% but is equal to or smaller than 100%. The curvature radius ratio ρ is of the specific flat injection hole 131 shown in FIGS. 7 and 8 corresponds to 100%. Here, the second curvature radius R2, which is used for the calculation of the curvature radius ratio ρ, refers to the radius of curvature of the segment of the end portion of the outlet opening 15 directed in the axial direction of the long axis at the one-side wall section of the inner wall which is located on the one side of the long axis Ha and guides the fuel at the fuel injection time. With respect to the shape indicated in FIGS. 7 and 8, since the radius of curvature of each of the segments, which are respectively located on the one side and the other side of the long axis Ha, is R2, there is no difference whether the radius of curvature of which one of these segments is used.

Figure 9:
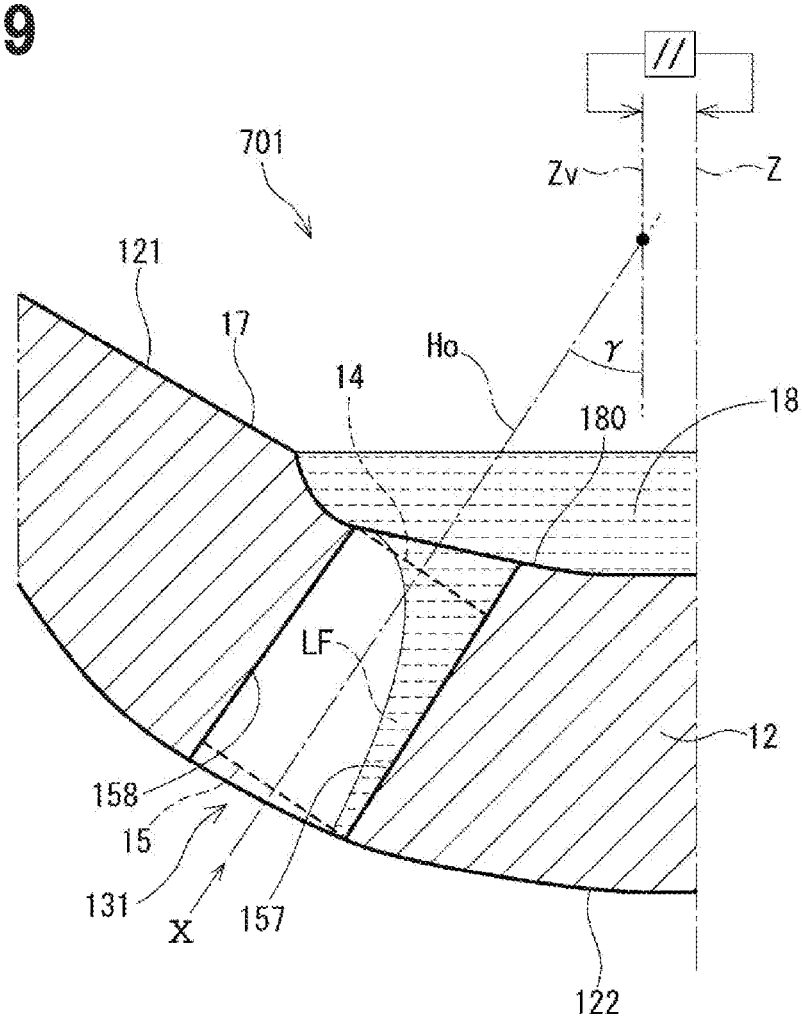
FIG. 9 is an axial cross-sectional view of the injection hole, indicating a one-side wall section of an inner wall which guides the fuel at a fuel injection time.

Now, with reference to FIGS. 9 and 10, the injection hole shape of the specific flat injection hole 131 of the first embodiment will be described. FIG. 9 indicates a state where the liquid film LF of the fuel is guided along the inner wall of the injection hole 13 at the fuel injection time in the axial cross-section taken along the injection hole axis Ho shown in FIG. 4. A depth direction, which is perpendicular to the plane of FIG. 9, corresponds to the axial direction of the long axis. In this example, the fuel is guided along the one-side wall section of the inner wall, which is close to the valve axis Z, and the fuel is not guided along the other-side wall section of the inner wall, which is far from the valve axis Z. Hereinafter, the one planar portion at the one-side wall section of the inner wall, which is located on the one side of the long axis and guides the fuel, is indicated by the reference sign 157, and the other planar portion at the other-side wall section of the inner wall, which does not guide the fuel, is indicated by the reference sign 158. Furthermore, the other-side wall section of the inner wall, which does not guide the fuel at the fuel injection time, will be referred to as the other-side wall section of the inner wall, which is located on the opposite side of the long axis that is opposite to the one-side wall section which guides the fuel at the fuel injection time.

Figure 10:
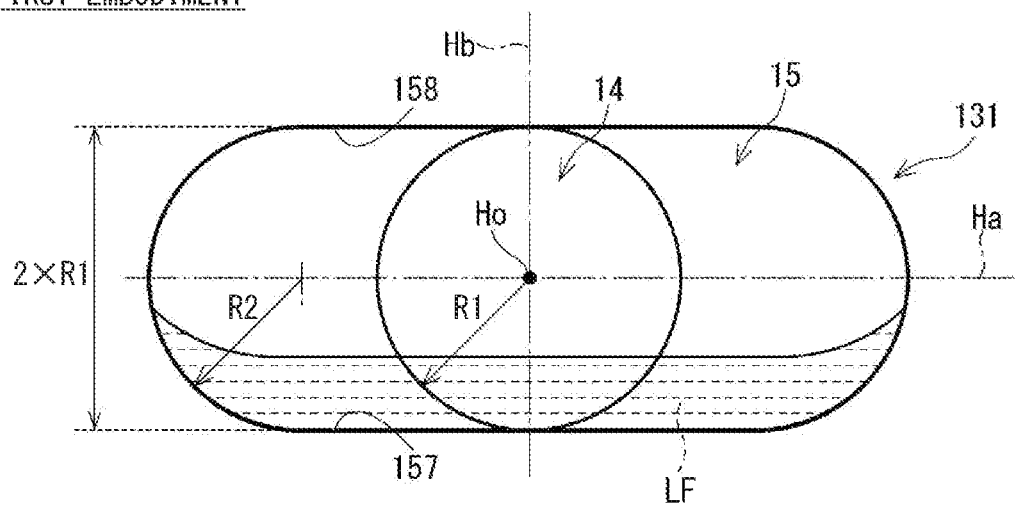
FIG. 10 is a schematic diagram showing a shape of the injection hole according to the first embodiment.

FIG. 10 is a projection view of FIG. 9 seen in a direction of an arrow X in FIG. 9, i.e., seen in the axial direction of the injection hole axis Ho. Two cross-sections, which are respectively indicated by a dotted line and are perpendicular to the injection hole axis Ho in FIG. 9, are respectively indicated as the inlet opening 14 and the outlet opening 15 in FIG. 10. The inlet opening 14 is shaped in the circle, and the radius of this circle is the first curvature radius R1. Each of the two opposite end portions of the outlet opening 15, which are directed opposite to each other in the axial direction of the long axis, is shaped in the semicircle, and the radius of this semicircle is the second curvature radius R2. In the first embodiment, a shape of the one-side wall section (i.e., the wall section on the planar portion 157 side of the long axis Ha) of the inner wall, which is located on the one side of the long axis Ha and guides the fuel at the fuel injection time, and a shape of the other-side wall section (i.e., the wall section on the planar portion 158 side of the long axis Ha), which is opposite to the one-side wall section, are symmetric to each other with respect to the long axis Ha.

Furthermore, since the spreading angle of the inner wall in the cross-section taken along the short axis Hb is 0°, a length of the short axis Hb of the outlet opening 15 is equal to a diameter (=2×R1) of the inlet opening 14. Therefore, in the specific flat injection hole 131 of the first embodiment, the relationship of R1=R2 is set. By minimizing the size of the area of the outlet opening at the other-side wall section that is opposite to the one-side wall section along which the fuel is guided at the fuel injection time, the incomplete combustion products (deposits) are less likely to accumulate on the inner wall according to the finding of JP2017-2876A.

Figure 11:
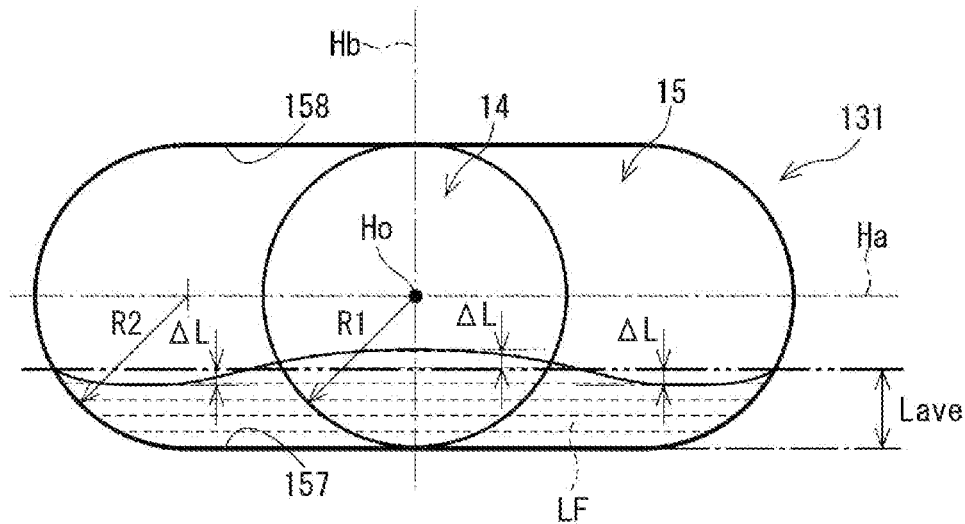
FIG. 11 is a diagram for explaining liquid film homogeneity.

Next, the liquid film homogeneity will be described with reference to FIGS. 11 and 12. FIG. 11 schematically shows a state where a thickness of the liquid film LF along the inner wall of the specific flat injection hole 131 varies depending on a location along the inner wall in the axial direction of the long axis. An average liquid film thickness is denoted by Lave, and a difference of the liquid film thickness from the average liquid film thickness Lave at each location is denoted by ΔL. For example, a value (σ/Lave), which is obtained by dividing a standard deviation σ of the liquid film thickness by the average liquid film thickness Lave, is defined as a value of the liquid film homogeneity. When the value of the liquid film homogeneity is small, the degree of dispersion of the fuel spray is high, and thereby the wall surface Wet is reduced.

Figure 12:
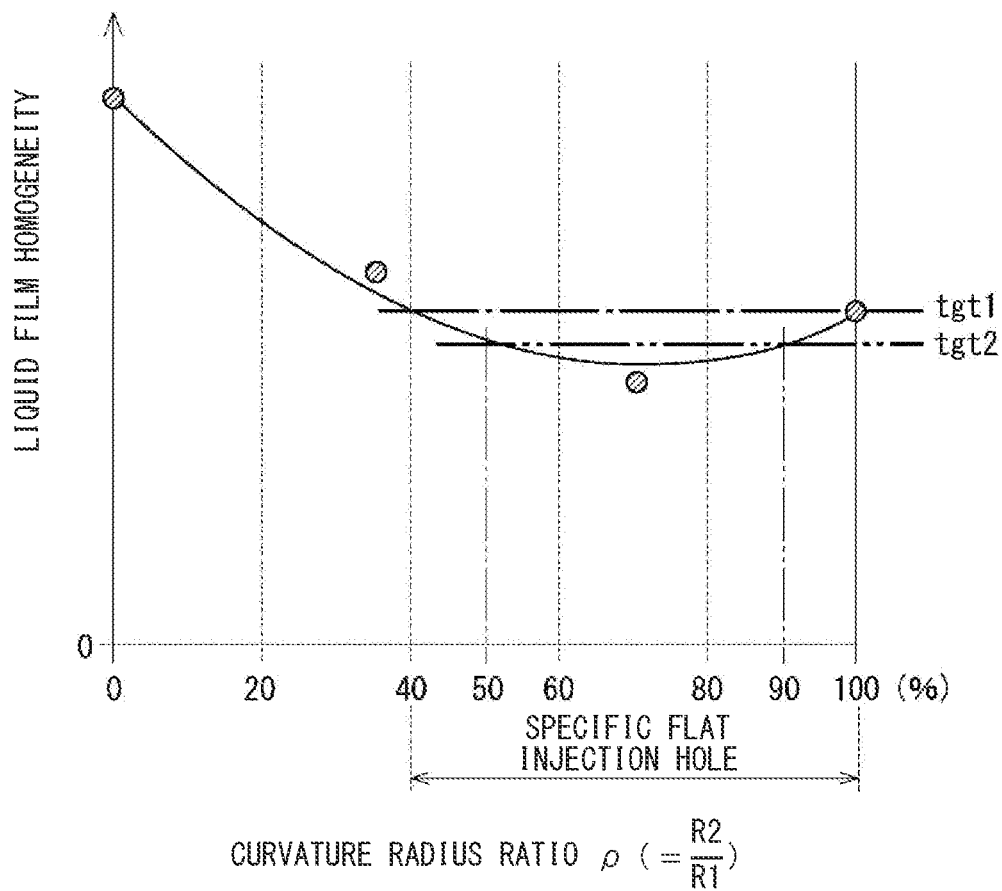
FIG. 12 is a diagram indicating a relationship between a curvature radius ratio and the liquid film homogeneity.

FIG. 12 shows an analysis result of the relationship between the curvature radius ratio ρ of the flat injection hole and the liquid film homogeneity. In a case where the curvature radius ratio ρ is in a range of 0% to about 70%, when the curvature radius ratio ρ is increased, the value of the liquid film homogeneity is decreased. In a case where the curvature radius ratio ρ is in a range, which is from about 70% to 100%, when the curvature radius ratio ρ is increased, the value of the liquid film homogeneity is increased. That is, when the curvature radius ratio ρ is about 70%, the value of the liquid film homogeneity is minimum.

In a case where a target value tgt1 of the liquid film homogeneity is set as indicated by a dot-dash line, the value of the liquid film homogeneity becomes equal to or less than the target value tgt1 when the curvature radius ratio ρ is equal to or larger than 40% but is equal to less than 100%. This is the reason why the third requirement for the specific flat injection hole is that the curvature radius ratio ρ is in the range of 40% to 100%. In the specific flat injection hole 131 of the first embodiment, the relationship of R1=R2 is set, and the curvature radius ratio ρ is 100%. Therefore, the curvature radius ratio ρ of the specific flat injection hole 131 is in the above-described range. As a result, the fuel injection valve 701 of the first embodiment can implement the highly dispersed and highly homogeneous fuel spraying. Thus, the fuel after the adhesion thereof to the wall surface can be rapidly evaporated, and the wall surface Wet can be reduced.

Furthermore, in a case where a target value tgt2 of the liquid film homogeneity is set as indicated by a dot-dot-dash line, the value of the liquid film homogeneity becomes equal to or less than the target value tgt2 when the curvature radius ratio ρ is equal to or larger than 50% but is equal to less than 90%. Therefore, in order to achieve the better liquid film homogeneity, it is preferable that the curvature radius ratio ρ of the specific flat injection hole is in the range of 50% to 90%. In this case, in order to implement the relationship of R1>R2, it is preferable to use the structure of, for example, the second to fifth embodiments described later.

(Variations of the Injection Hole Shape)

Next, with reference to FIGS. 13 to 17, variations, in each of which the shape of the specific flat injection hole is different from that of the first embodiment, will be described as the second to fifth embodiments. The shape of the respective specific flat injection holes 132-135 of each of the second to fifth embodiments is indicated by a projection view thereof, which corresponds to FIG. 10 of the first embodiment and is taken in the axial direction of the injection hole axis Ho. In each of FIGS. 13 to 17, the liquid film LF, which is guided along the inner wall at the fuel injection time, is indicated.

In the second to fourth embodiments, the shape of the inlet opening 14 is the circle, and the radius of this circle is the first curvature radius R1. It is common to the second to fifth embodiments that at the one-side wall section (i.e., the wall section located on the planar portion 157 side of the long axis Ha), along which the fuel is guided at the fuel injection time, the radius of curvature of the segment of each of the two opposite end portions of the outlet opening 15 directed opposite to each other in the axial direction of the long axis Ha, is the second curvature radius R2. In the second and third embodiments, the length of the short axis Hb of the outlet opening 15 is equal to the diameter (=2×R1) of the inlet opening 14.

Second Embodiment

Figure 13:
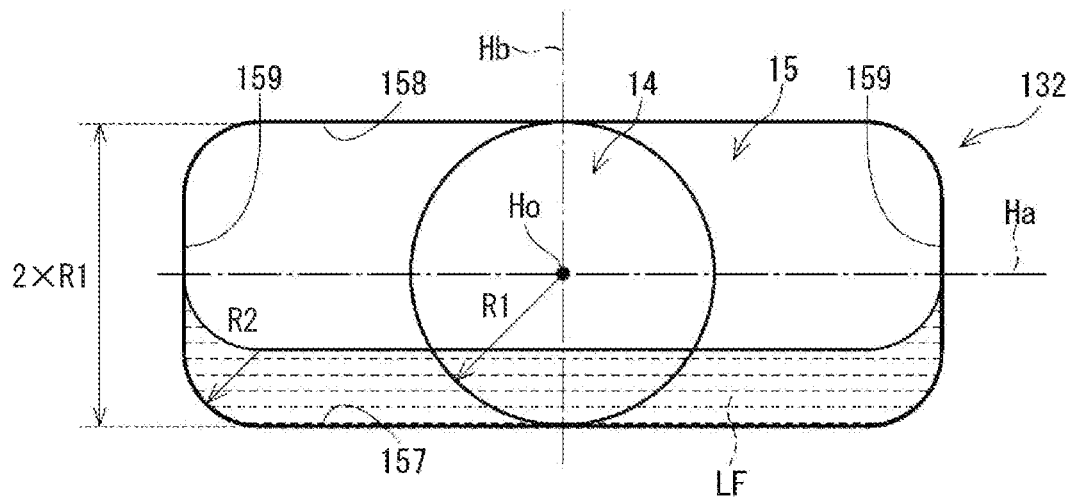
FIG. 13 is a schematic diagram showing a shape of an injection hole according to a second embodiment.

In the specific flat injection hole 132 of the second embodiment shown in FIG. 13, at each of the one-side wall section and the other-side wall section, which are respectively located on the one side and the other side of the long axis Ha, the second curvature radius R2 of the segment of each of the two opposite end portions of the outlet opening 15, which are directed opposite to each other in the axial direction of the long axis Ha, is set to be smaller than the first curvature radius R1 of the inlet opening 14. Specifically, there is satisfied a relationship of R2<R1.

Each of the two portions of the inner wall, which are located at the outlet opening 15 and extend in the axial direction of the short axis, has a straight portion 159 that extends straight. Specifically, the outlet opening 15 is shaped in a generally elongated rectangle shape that has four corners each of which is formed as an arcuate segment having the second curvature radius R2. In the second embodiment, the relationship of R2<R1 can be implemented by the simple shape according to the target value of the curvature radius ratio ρ.

Third Embodiment

Figure 14:
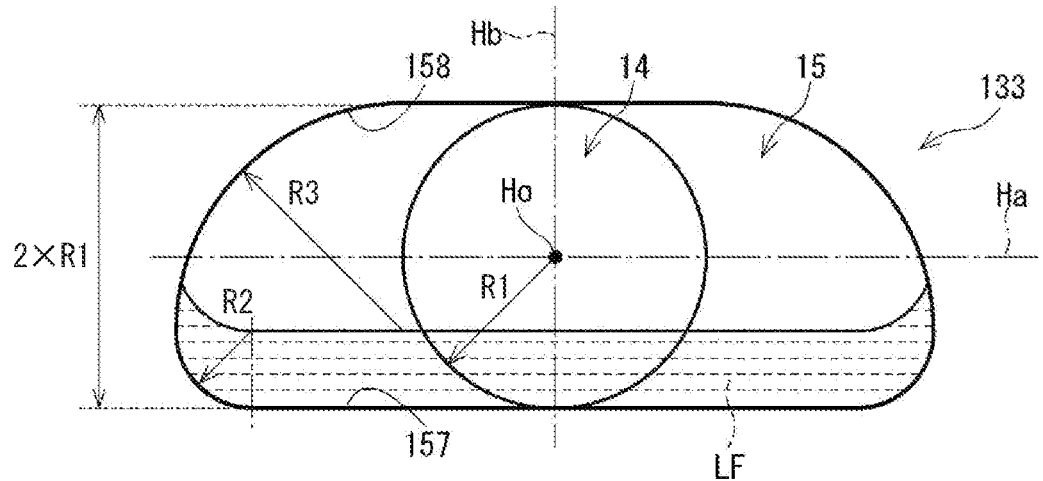
FIG. 14 is a schematic diagram showing a shape of an injection hole according to a third embodiment.

The specific flat injection hole 133 of the third embodiment shown in FIG. 14 is formed as follows. That is, at the one-side wall section (i.e., the wall section located on the planar portion 157 side of the long axis Ha), along which the fuel is guided at the fuel injection time, the second curvature radius R2 of the segment of each of the two opposite end portions of the outlet opening 15, which are directed opposite to each other in the axial direction of the long axis Ha, is set to be smaller than the first curvature radius R1 of the inlet opening 14. At the other-side wall section (i.e., the wall section located on the planar portion 158 side of the long axis Ha) that is opposite to the one-side wall section, along which the fuel is guided at the fuel injection time, a third curvature radius R3, which is a radius of curvature of a segment of each of the two opposite end portions of the outlet opening 15 directed away from each other in the axial direction of the long axis, is set to be larger than the first curvature radius R1 of the inlet opening 14. Specifically, there is satisfied a relationship of R2<R1<R3.

In the example of FIG. 14, the specific flat injection hole 133 is illustrated to implement the relationship of R2+R3=2×R1, and the straight portions are not formed at the two portions of the inner wall which are opposed to each other and extend in the axial direction of the short axis. In the case of satisfying another relationship of R2+R3<2×R1, the straight portions may be respectively formed at the two portions of the inner wall, which are opposed to each other and extend in the axial direction of the short axis. In the third embodiment, it is possible to reduce the opening area of the outlet opening at the other-side wall section that is opposite to the one-side wall section, along which the fuel is guided at the fuel injection time. Therefore, according to the finding of JP2017-2876A, the incomplete combustion products (deposits) are less likely to accumulate on the inner wall.

Fourth Embodiment

Figure 15:
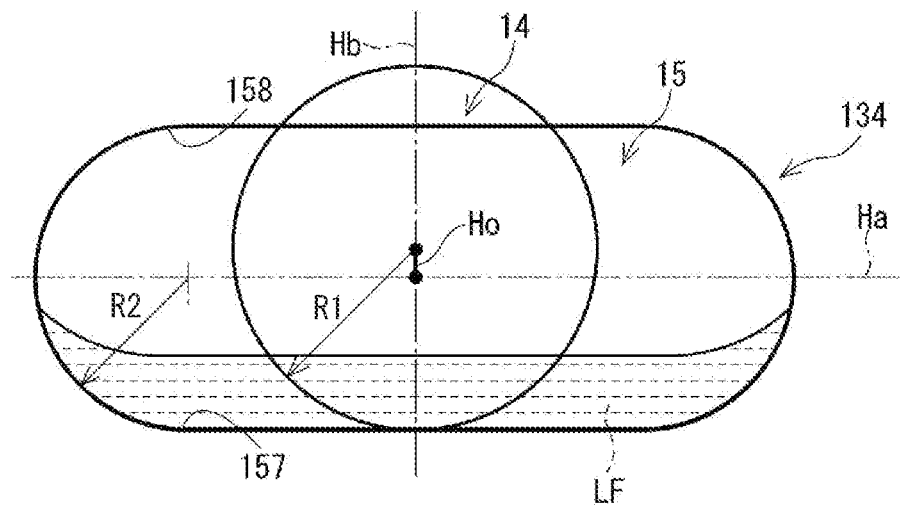
FIG. 15 is a schematic diagram showing a shape of an injection hole according to a fourth embodiment.

In comparison to the specific flat injection hole 131 of the first embodiment, in the specific flat injection hole 134 of the fourth embodiment shown in FIG. 15, the length (2×R2) of the short axis Hb is set to be smaller than the diameter (2×R1) of the inlet opening 14. Specifically, there is satisfied a relationship of R2<R1. Here, at the one-side wall section (i.e., the wall section located on the planar portion 157 side of the long axis Ha), along which the fuel is guided at the fuel injection time, the location of inner wall of the inlet opening 14 and the location of the inner wall of the outlet opening 15 relative to the injection hole axis Ho coincide with each other.

In contrast, at the other-side wall section (i.e., the wall section located on the planar portion 158 side of the long axis Ha) that is opposite to the one-side wall section, along which the fuel is guided at the fuel injection time, a portion of the inner wall progressively approaches the injection hole axis Ho in the direction directed from the inlet opening 14 toward the outlet opening 15. Specifically, there is formed a surface of the inner wall that has a reverse slope which is reversed relative to a slope of an ordinary tapered injection hole. Even with this structure, it is possible to implement the relationship of R2<R1.

Fifth Embodiment

Figure 16:
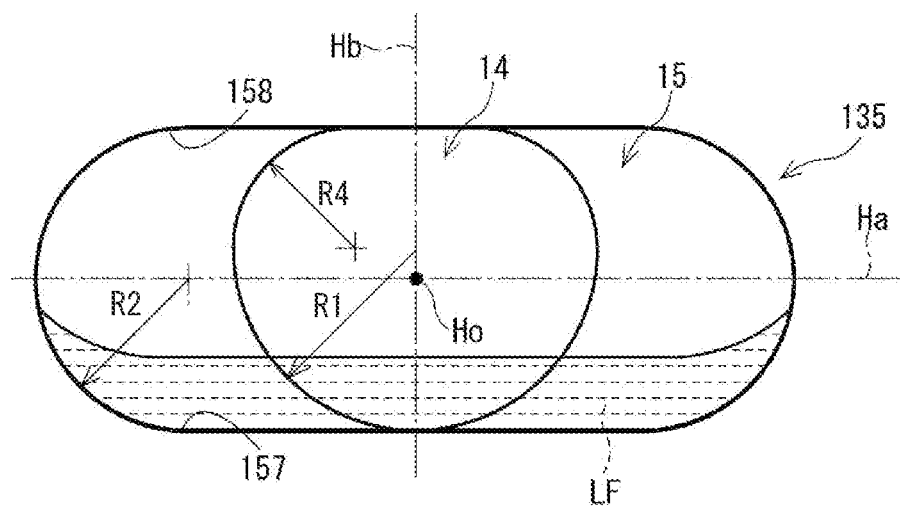
FIG. 16 is a schematic diagram showing a shape of an injection hole according to a fifth embodiment.

In the specific flat injection hole 135 of the fifth embodiment shown in FIG. 16, the inlet opening 14 is not the circle unlike the specific flat injection hole 131 of the first embodiment. At the one-side wall section (i.e., the wall section located on the planar portion 157 side of the long axis Ha), along which the fuel is guided at the fuel injection time, the first curvature radius R1 of the inlet opening 14 is set to be larger than the second curvature radius R2 of the segment of each of the two opposite end portions of the outlet opening 15, which are directed opposite to each other in the axial direction of the long axis Ha. In contrast, at the other-side wall section (i.e., the wall section located on the planar portion 158 side of the long axis Ha) that is opposite to the one-side wall section, along which the fuel is guided at the fuel injection time, a fourth curvature radius R4 of a segment of the inlet opening 14 is set to be smaller than the second curvature radius R2 of the segment of each of the two opposite end portions of the outlet opening 15, which are directed opposite to each other in the axial direction of the long axis Ha. Specifically, there is satisfied a relationship of R4<R2<R1.

As described above, the shape of the inlet opening 14 is not necessarily the circle. For example, a product, which is processed in the shape of the specific flat injection hole 131 of the first embodiment, may be further processed in the shape of the specific flat injection hole 135 of the fifth embodiment, so that the specific flat injection hole 131 can be modified to reduce the curvature radius ratio ρ.

Variations in the Number of the Injection Holes and the Arrangement of the Injection Holes Next, with reference to FIGS. 17 to 23, variations, in each of which the number of the injection holes and/or the arrangement of the injection holes are different from those of the first embodiment, will be described as the sixth to eleventh embodiments. The fuel injection valves of the sixth to ninth embodiments are designed to be installed to the side-mount type engine 801 shown in FIGS. 2 and 3 like in the first embodiment. The fuel injection valves of the tenth and eleventh embodiments are designed to be installed to the center-mount type engine 802 shown in FIG. 21.

The arrangement of the respective holes in each of the sixth to eleventh embodiments is indicated by a projection view thereof, which corresponds to FIG. 7 of the first embodiment and is taken in the axial direction of the valve axis Z. In each of the sixth to eleventh embodiments, a center of the inlet opening 14 of each injection hole is located on the concentric circle σi that is centered on the valve axis Z. Furthermore, as discussed above, in the projection view taken in the axial direction of the valve axis Z, when the distance between the center of the inlet opening 14 and the center of the outlet opening 15 is increased, the injection hole angle γ shown in FIGS. 4 and 10 is increased.

In the sixth to eighth and tenth to eleventh embodiments, which are other than the ninth embodiment, all of the injection holes are formed as the specific flat injection holes. Specifically, the long axis Ha is perpendicular to the plane Sh that includes the injection hole axis Ho and is parallel with the valve axis, and the inner wall has the two planar portions which are opposed to each other while the long axis Ha is interposed between the two planar portions. As shown in FIG. 8, since the plane Sh is indicated by the same line as the line of the injection hole axis Ho, the indication of the reference sign Sh in the drawings is omitted. The curvature radius ratio ρ is in the range of 40% to 100%. In the ninth embodiment, some of the injection holes are formed as the specific flat injection holes.

Furthermore, the description about the utilization of the Coanda effect between the two fuel sprays to avoid the fuel spray interference among the three adjacent fuel sprays discussed in the first embodiment is also applied to the sixth to eleventh embodiments.

Sixth Embodiment

Figure 17:
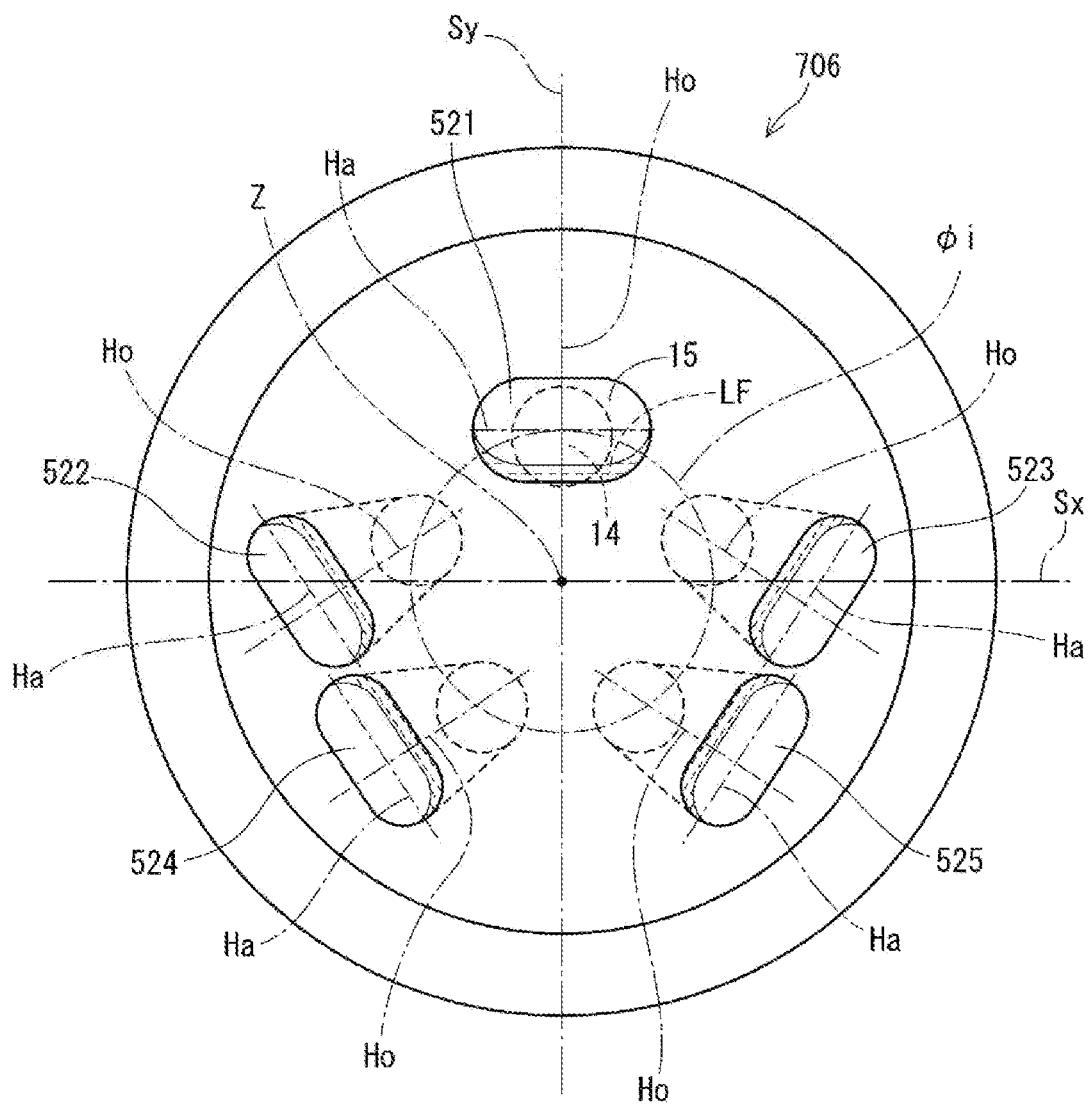
FIG. 17 is a schematic diagram showing an arrangement of injection holes (five holes) of a fuel injection valve according to a sixth embodiment.

The fuel injection valve 706 of the sixth embodiment shown in FIG. 17 has five specific flat injection holes 521-525 arranged around the valve axis Z like the fuel injection valve 701 of the first embodiment. In the sixth embodiment, the diameter of the inlet opening 14 is relatively large in comparison to the first embodiment. Furthermore, in the second to fifth injection holes 522-525, a ratio of the length of the long axis Ha relative to the length of the short axis Hb is larger than that of the first injection hole 521. Specifically, the second to fifth injection holes 522-525 are respectively formed as a flat injection hole that has a degree of flatness which is larger than that of the first injection hole 521. Furthermore, the injection hole angles γ of the second and third injection holes 522, 523 are the largest among the specific flat injection holes 521-525.

As discussed above, even in the five hole design of the fuel injection valve for the side-mount type engine, the size and the shape of each injection hole and the detail arrangement of the injection holes may be appropriately designed. Basically, the highly dispersed and highly homogeneous fuel spraying can be implemented by using a specific flat injection hole of any specification.

Seventh Embodiment

Figure 18:
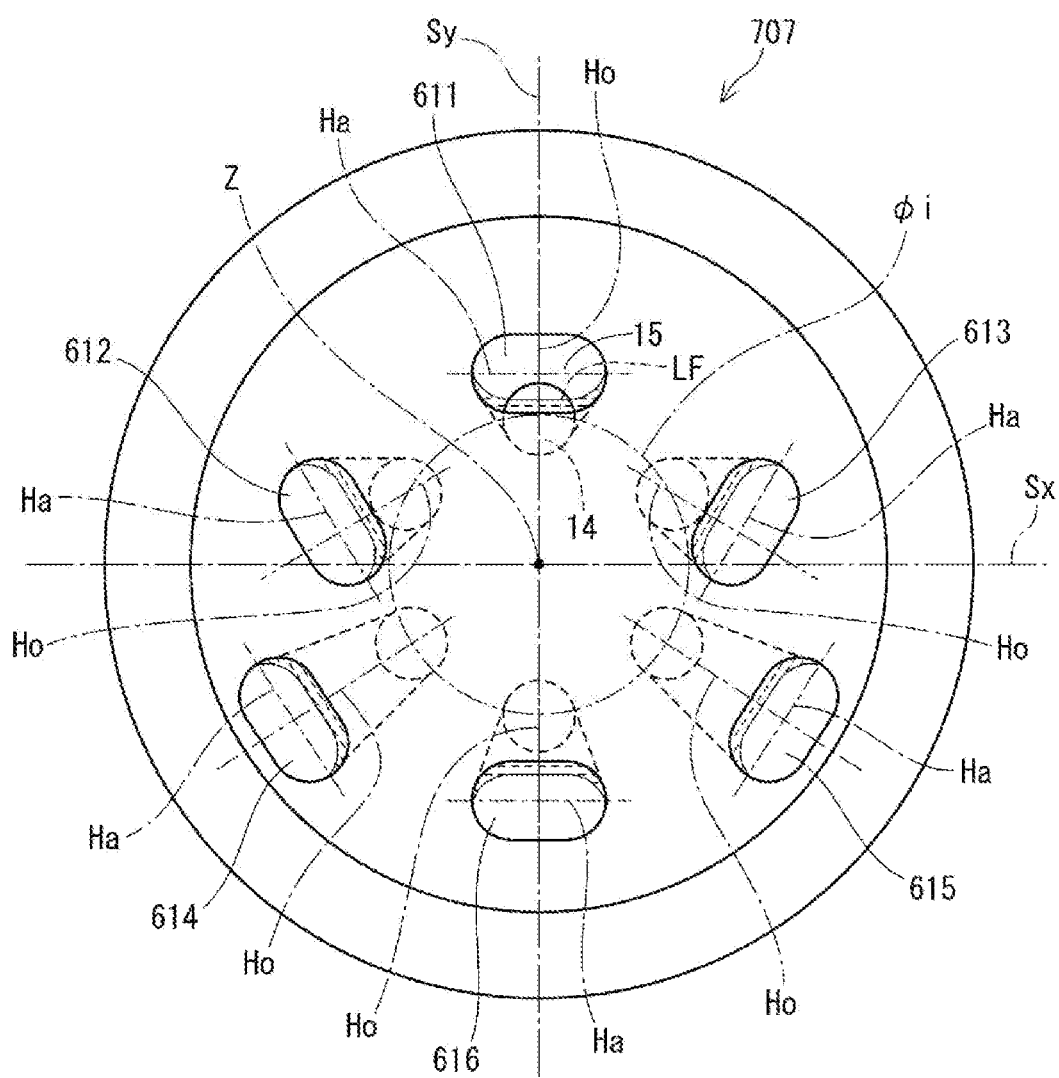
FIG. 18 is a schematic diagram showing an arrangement of injection holes (six holes) of a fuel injection valve according to a seventh embodiment.

The fuel injection valve 707 of the seventh embodiment shown in FIG. 18 has six specific flat injection holes 611-616 arranged around the valve axis Z. The first injection hole 611 and the sixth injection hole 616 are placed on the reference plane Sy. Furthermore, the second and third injection holes 612, 613 are symmetrically arranged with respect to the reference plane Sy, and the fourth and fifth injection holes 614, 615 are symmetrically arranged with respect to the reference plane Sy. The second and third injection holes 612, 613 and the fourth and fifth injection holes 614, 615 are respectively arranged such that the long axis Ha thereof is progressively spaced from the reference plane Sy in a direction that is directed from the sixth injection hole 616 toward the first injection hole 611.

Therefore, in view of the injection hole angle γ, the injection hole angle γ of the first injection hole 611 is the smallest, and the injection hole angles γ of the second and third injection holes 612, 613 and the sixth injection hole 616 are the next smallest. Furthermore, the injection hole angles γ of the fourth and fifth injection holes 614, 615 are the largest among the specific flat injection holes 611-616.

In each of the first injection hole 511, the fourth and fifth injection holes 614, 615 and the sixth injection hole 616 that respectively have the injection hole axis Ho tilted in the radially outer direction of the valve axis Z, a wall section of the inner wall, which is located on the valve axis Z side of the long axis Ha, serves as the one-side wall section of the inner wall which guides the fuel at the fuel injection time. Furthermore, in each of the second and third injection holes 612, 613 that has the injection hole axis Ho tilted in a direction away from the reference plane Sy, a wall section of the inner wall, which is located on the reference plane Sy side of the long axis Ha, serves as the one-side wall section of the inner wall which guides the fuel at the fuel injection time.

Even in the seventh embodiment, in which all of the six injection holes are formed as the specific flat injection holes, the highly dispersed and highly homogeneous fuel spraying can be implemented. In the six hole design, in addition to the group of the first, second and third injection holes 611, 612, 613, even in the group of the second, fourth and sixth injection holes 612, 614, 616 and the group of the third, fifth and sixth injection holes 613, 615, 616, the negative pressure is generated in the closed space formed among the three adjacent fuel sprays, and this negative pressure causes the fuel spray interference. Therefore, the avoidance of the fuel spray interference by the Coanda effect between the two fuel sprays becomes effective.

Eighth Embodiment

Figure 19:
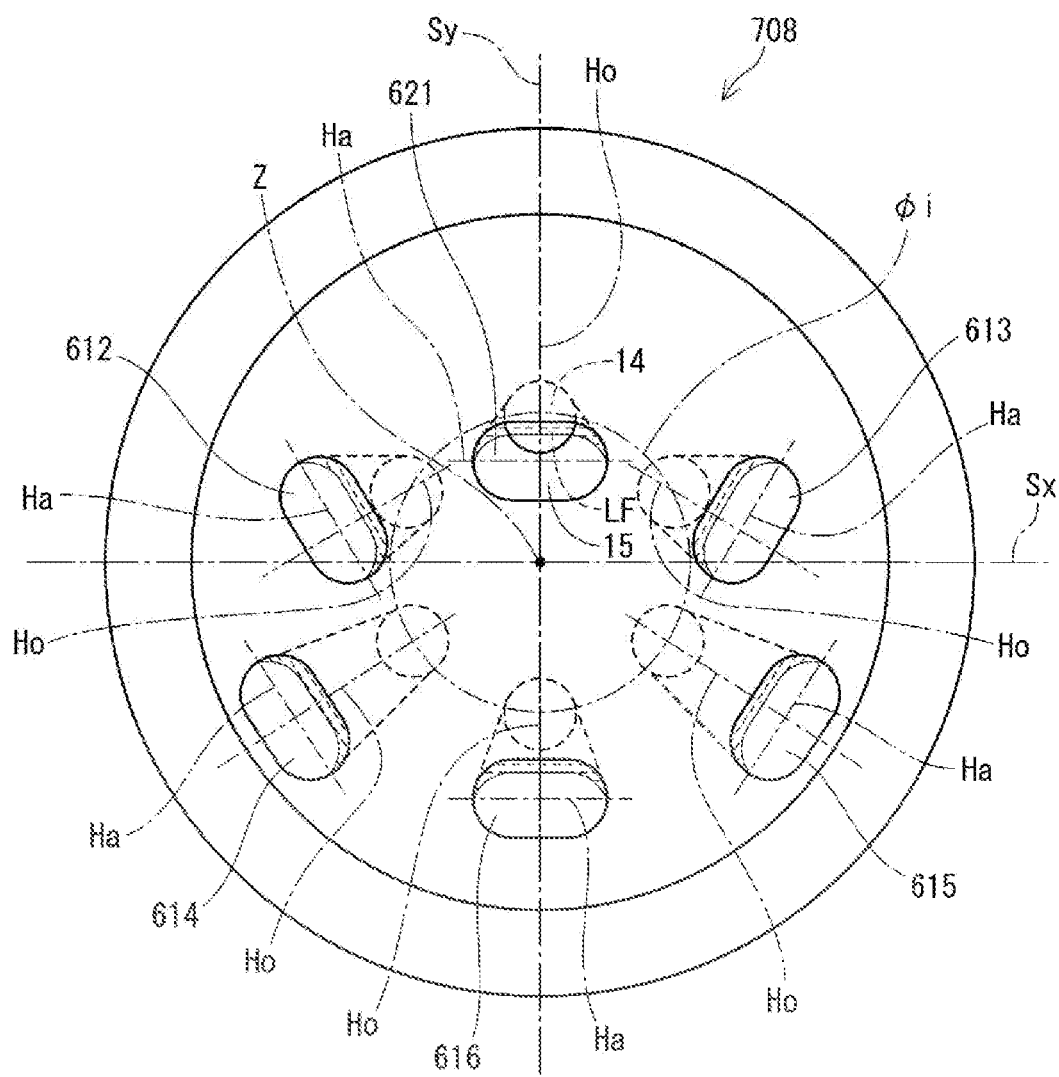
FIG. 19 is a schematic diagram showing an arrangement of injection holes (six holes) of a fuel injection valve according to an eighth embodiment.

The fuel injection valve 708 of the eighth embodiment shown in FIG. 19 is a modification of the fuel injection valve 707 of the seventh embodiment with respect to the injection hole arrangement, and the location of only the first injection hole 621 is different from that of the fuel injection valve 707. Specifically, the injection hole axis Ho of the first injection hole 621 is tilted toward the valve axis Z in the direction that is directed from the inlet opening 14 toward the outlet opening 15, that is, the injection hole axis Ho of the first injection hole 621 is tilted in the radially inner direction relative to the valve axis Z. In this structure, a wall section of the inner wall of the first injection hole 621, which is located on the opposite side of the long axis Ha that is opposite to the valve axis Z, serves as the one-side wall section of the inner wall which guides the fuel at the fuel injection time unlike the other injection holes 612-616.

As discussed above, the one-side wall section of the inner wall, which guides the fuel at the fuel injection time, is not always located on the valve axis Z side of the long axis Ha. In the first injection hole 621, in the projection view taken in the axial direction of the valve axis Z, the wall section of the inner wall, which is located on the inlet opening 14 side of the long axis Ha, serves as the one-side wall section of the inner wall which guides the fuel at the fuel injection time. Even with this structure, the highly dispersed and highly homogeneous fuel spraying can be implemented.

Ninth Embodiment

Figure 20:
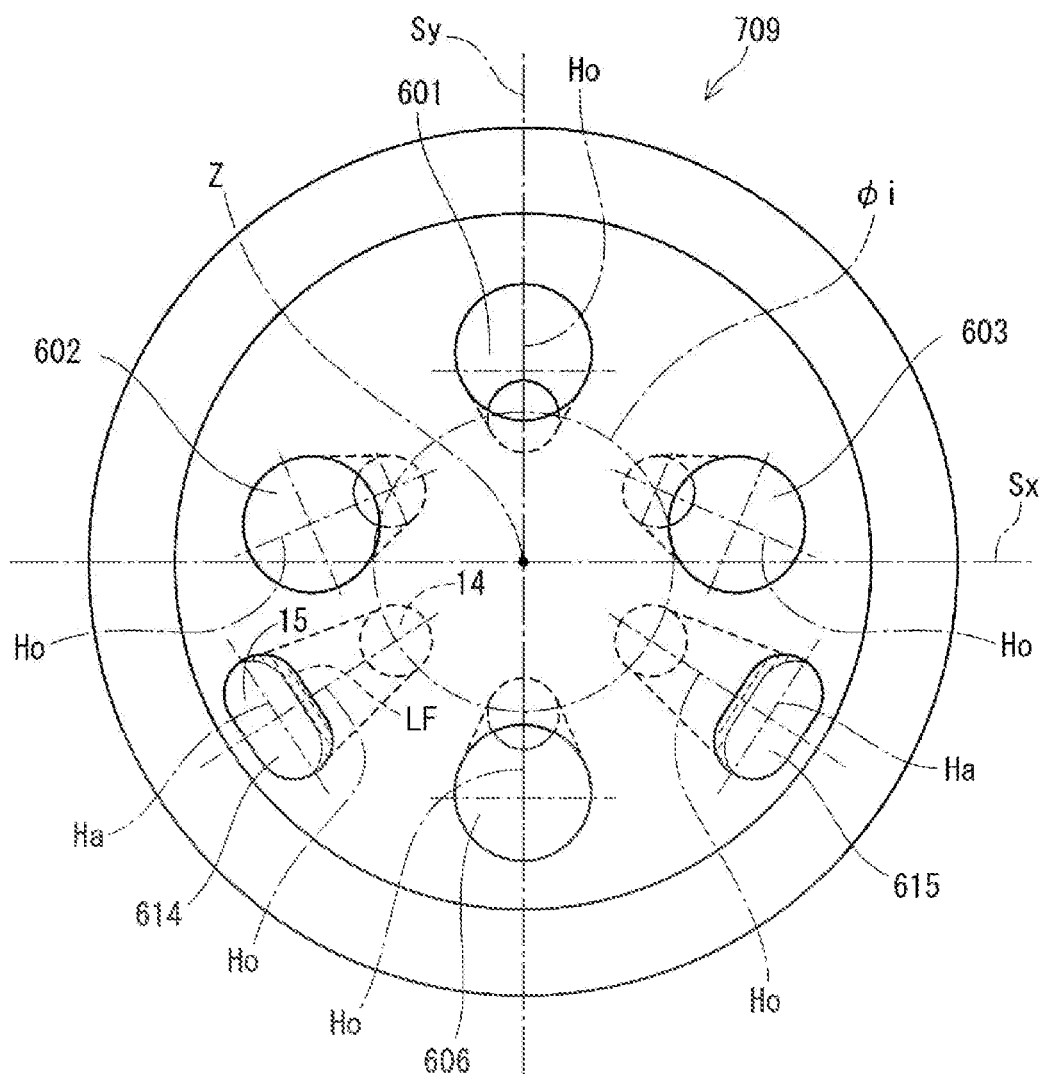
FIG. 20 is a schematic diagram showing an arrangement of injection holes (six holes) of a fuel injection valve according to a ninth embodiment.

The fuel injection valve 709 of the ninth embodiment shown in FIG. 20 is a modification of the fuel injection valve 707 of the seventh embodiment with respect to the injection hole arrangement. In the fuel injection valve 709, only the fourth and fifth injection holes 614, 615 are the specific flat injection holes which are common to the specific flat injection holes of the fuel injection valve 707, and the other four injection holes 601, 602, 603, 606 are circular injection holes. The fourth and fifth injection holes 614, 615 serve as two (a pair of) injection holes, each of which has an injection hole angle γ that is the largest among the six injection holes, and it is thought that the fourth and fifth injection holes 614, 615 have the greatest effect on the implementation of the highly dispersed and highly homogeneous fuel spraying by having the form of the specific flat injection hole.

As discussed above, it is not necessary to form all of the injection holes as the specific flat injection holes. That is, some of the injection holes may be formed as the specific flat injection hole, and the rest of the injection holes may be the circular injection hole or the flat injection hole that is other than the specific flat injection hole. In such a case, it is preferred that among the injection holes, which are symmetrically arranged with respect to the reference plane Sy, at least two (at least a pair of) injection holes, which have the largest injection hole angle γ, are formed as the specific flat injection holes. For example, in the fuel injection valve 701 of the first embodiment, which has the five hole design, it is preferred that at least the fourth and fifth injection holes 514, 515 are formed as the specific flat injection holes.

Tenth and Eleventh Embodiments

Next, the fuel injection valves of the tenth and eleventh embodiments will be described with reference to FIGS. 21 to 23. The fuel injection valves of the tenth and eleventh embodiments are installed at the center of the cylinder head of the center-mount type engine 802 shown in FIG. 21 and inject a plurality of fuel sprays Fo respectively shaped in a conical form into the combustion chamber 83. The center-mount type engine is disclosed in, for example, FIG. 11 of JP2018-31275A. As the reference sign of the fuel injection valve shown in FIG. 21, the general reference sign 70 is used.

Figure 22:
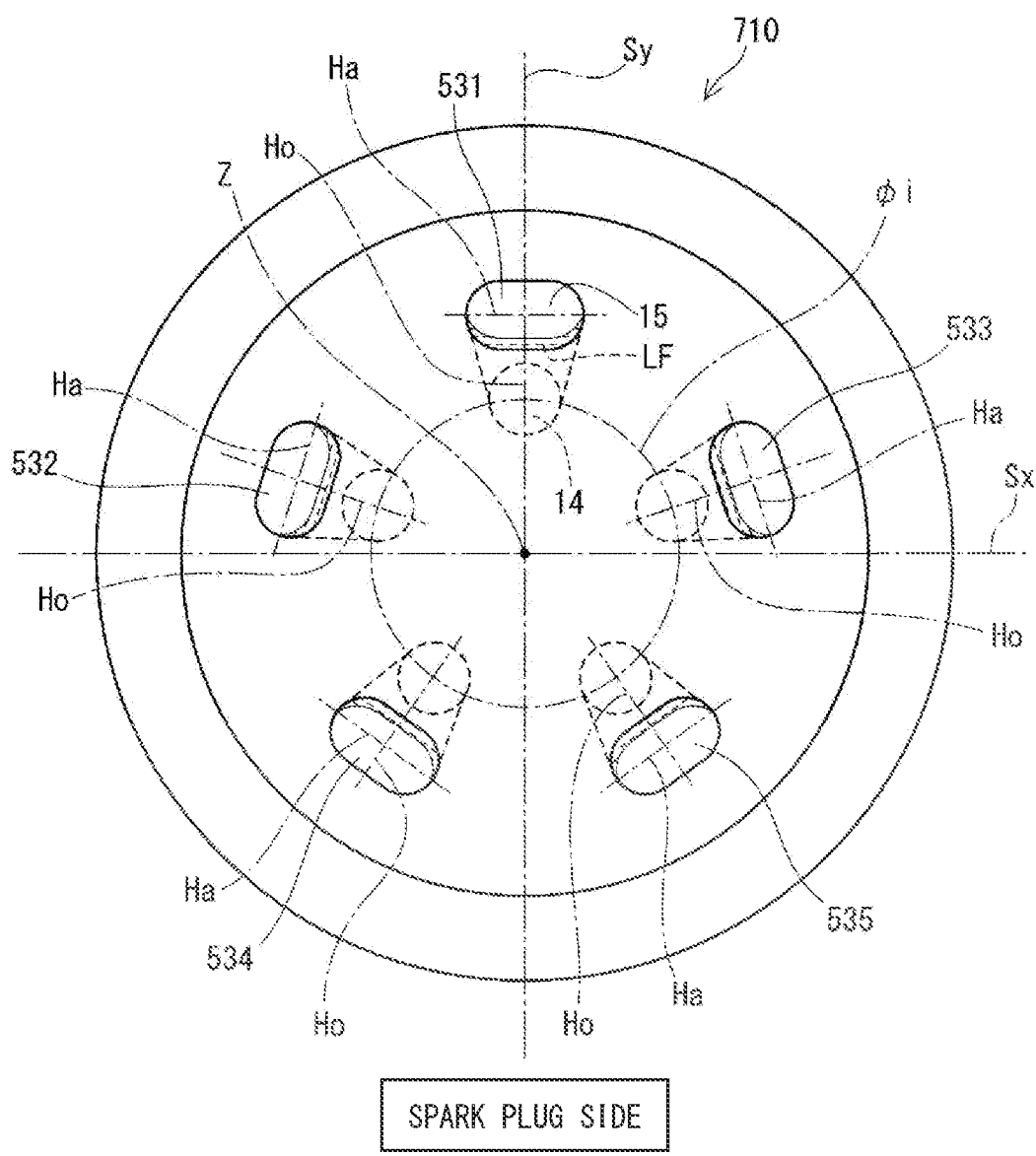
FIG. 22 is a schematic diagram showing an arrangement of injection holes (five holes) of the fuel injection valve according to the tenth embodiment.

The fuel injection valve 710 of the tenth embodiment shown in FIG. 22 has five specific flat injection holes 531-535 arranged around the valve axis Z. The first injection hole 531 is placed on the reference plane Sy at a location that is opposite to the spark plug 97, and the other four injection holes 532-535 are symmetrically arranged with respect to the reference plane Sy. In each of the injection holes 531-535, the injection hole axis Ho is tilted in the radially outer direction of the valve axis Z, and a wall section of the inner wall, which is located on the valve axis Z side of the long axis Ha, serves as the one-side wall section of the inner wall which guides the fuel at the fuel injection time.

Figure 23:
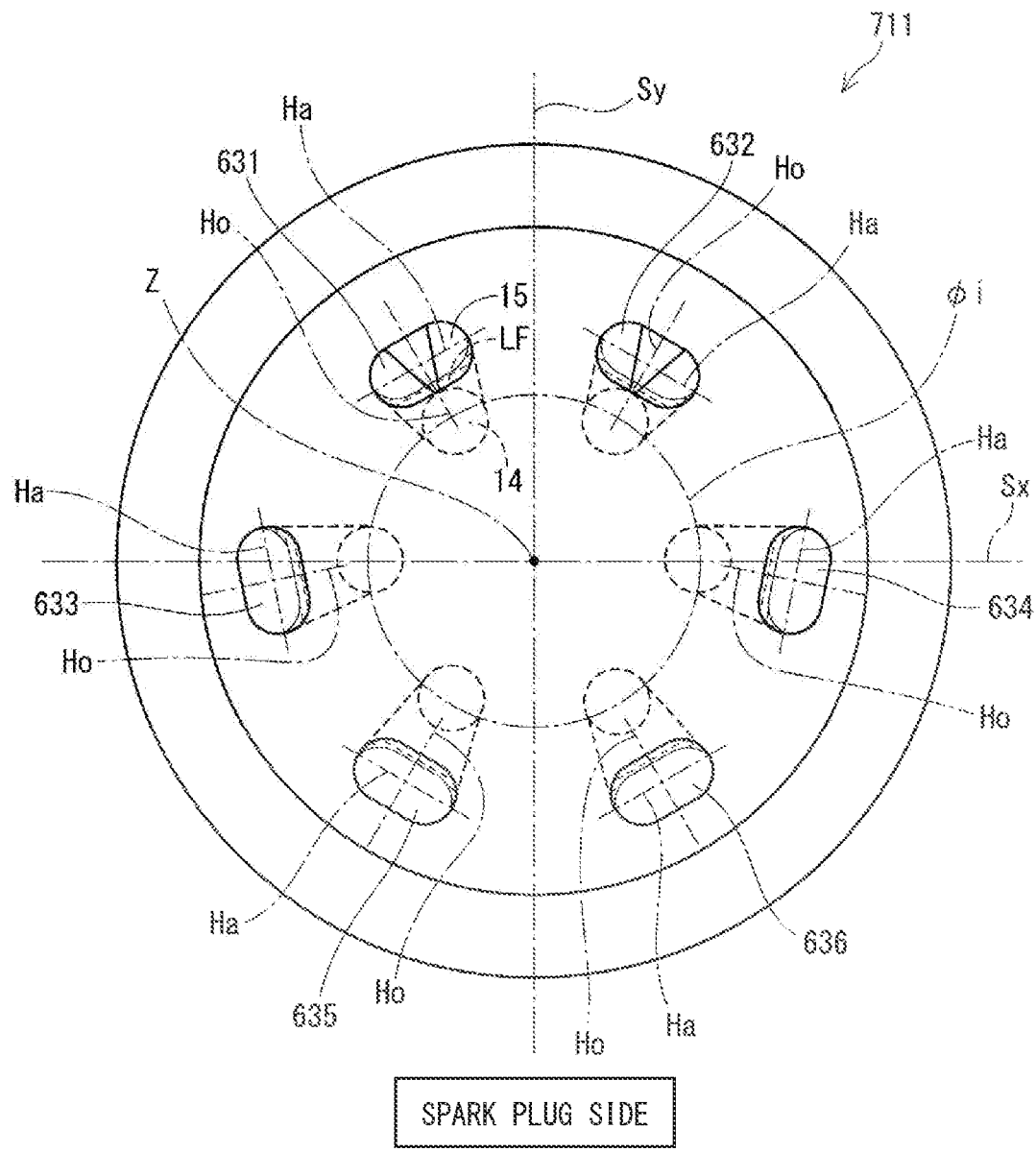
FIG. 23 is a schematic diagram showing an arrangement of injection holes (six holes) of the fuel injection valve according to the eleventh embodiment.

In the fuel injection valve 711 of the eleventh embodiment shown in FIG. 23, six specific flat injection holes 631-635 are arranged around the valve axis Z such that the six specific flat injection holes 631-636 are symmetrically arranged with respect to the reference plane Sy. In comparison to the injection hole angle γ of each of the first and second injection holes 631, 632, the injection hole angle γ of each of the third and fourth injection holes 633, 634 is larger, and the injection angle γ of each of the fifth and sixth injection holes 635, 636 is larger. Therefore, each of the injection holes 631-636 is not uniformly radiated, and a majority of each of the third and fourth injection holes 633, 634 is placed on the spark plug 97 side of the reference orthogonal plane Sx. In each of the injection holes 631-636, the injection hole axis Ho is tilted in the radially outer direction of the valve axis Z, and a wall section of the inner wall, which is located on the valve axis Z side of the long axis Ha, serves as the one-side wall section of the inner wall which guides the fuel at the fuel injection time.

As discussed above, even in the fuel injection valves 710, 711 installed to the center-mount type engine 802, the highly dispersed and highly homogeneous fuel spraying can be implemented by forming at least one fuel injection hole as the specific flat injection hole.

Other Embodiments (a) It is not necessary to form all of the flat injection holes as the specific flat injection holes. Specifically, one or some of the injection holes may include: a flat injection hole, the long axis Ha of which is not perpendicular to the plane Sh while the plane Sh includes the injection hole axis Ho and is parallel with the valve axis Z; a flat injection hole, which does not have the planar portion at the inner wall; or a flat injection hole, the curvature radius ratio of which is less than 40%.

(b) A recess, which is shown in, for example, FIG. 22 of JP2020-008013A (corresponding to US2021/0123403A), may be formed around the opening of each of the injection holes 13 at the other surface 122 of the nozzle bottom portion 12 which is located on the opposite side that is opposite to the nozzle tubular portion 11. In this structure, an opening, which is formed at a bottom surface of the recess, serves as the outlet opening 15, and an axis, which extends through a center of the outlet opening 15, is defined as the injection hole axis Ho. By forming the recess, the length of the injection hole axis can be adjusted to be shorter.

(c) The structure of each member of the fuel injection valve is not limited to the structure shown in FIG. 1 and may be modified such that the function, which is similar to the function of the member of the fuel injection valve shown in FIG. 1, is achieved. For example, the members, which are adjacent to each other and are made of the common material, may be formed as separate members or may be formed integrally in one-piece.

(d) The fuel injection valve of the present disclosure is not necessarily applied to the direct-injection gasoline engine but may be applied to, for example, a diesel engine or a port-injection type gasoline engine.

The present disclosure is not limited to the above-described embodiments and can be realized in various configurations within a range not deviating from the gist thereof.

The present disclosure has been described with reference to the embodiments. However, the present disclosure is not limited to the above embodiments and the structures described therein. The present disclosure also includes various variations and variations within the equivalent range. Also, various combinations and forms, as well as other combinations and forms that include only one element, more, or less, are within the scope and ideology of the present disclosure.

What is claimed is:

1. A fuel injection valve comprising:
   a nozzle that is centered on a valve axis and includes:
      a nozzle tubular portion that forms a fuel passage at an inside of the nozzle tubular portion;
      a nozzle bottom portion that closes one end of the nozzle tubular portion;
      a plurality of injection holes that connect between one surface of the nozzle bottom portion, which is located on one side where the nozzle tubular portion is placed, and another surface of the nozzle bottom portion, which is located on an opposite side that is opposite to the nozzle tubular portion, wherein the plurality of injection holes are configured to inject fuel that is received in the fuel passage; and a valve seat that is shaped in a ring form and is formed around the plurality of injection holes at the one surface of the nozzle bottom portion, which is located on the one side where the nozzle tubular portion is placed;

a needle that is configured to reciprocate along the valve axis at an inside of the nozzle, wherein the needle closes the plurality of injection holes when the needle contacts the valve seat, and the needle opens the plurality of injection holes when the needle is spaced away from the valve seat; and a drive device that is configured to drive the needle in a valve opening direction or a valve closing direction, wherein:

the drive device includes a stationary core, a movable core and a coil, wherein when the coil is energized, the movable core is magnetically attracted toward the stationary core to drive the needle in the valve opening direction;

each of the plurality of injection holes has:
- an inlet opening that is formed at the one surface of the nozzle bottom portion which is located on the one side where the nozzle tubular portion is placed; and
- an outlet opening that has a cross-sectional area larger than a cross-sectional area of the inlet opening and is formed at the another surface of the nozzle bottom portion which is located on the opposite side that is opposite to the nozzle tubular portion;

the plurality of injection holes include at least one flat injection hole while the outlet opening of the at least one flat injection hole has a long axis and a short axis, and the at least one flat injection hole includes at least one specific flat injection hole;

the at least one specific flat injection hole has an injection hole axis that connects between a center of the inlet opening and a center of the outlet opening while the long axis of the outlet opening of the at least one specific flat injection hole is perpendicular to a plane which includes the injection hole axis and is parallel with the valve axis;

an inner wall of the at least one specific flat injection hole has two planar portions which are opposed to each other while the long axis is interposed between the two planar portions;

at a one-side wall section of the inner wall which is located on one side of the long axis and guides the fuel at a fuel injection time, a radius of curvature of a segment of one end portion of the inlet opening directed in an axial direction of the long axis is defined as a first curvature radius, and a radius of curvature of a segment of one end portion of the outlet opening directed in the axial direction of the long axis is defined as a second curvature radius, and a ratio of the second curvature radius relative to the first curvature radius is defined as a curvature radius ratio, and the curvature radius ratio is in a range of 40% to 100%;

the plurality of injection holes are symmetrically arranged with respect to a reference plane that includes the valve axis;

the at least one specific flat injection hole is at least two specific flat injection holes, each of which has an injection hole angle that is an angle of the injection hole axis relative to an imaginary axis parallel with the valve axis, wherein the injection hole angle of each of the at least two specific flat injection holes is largest among the plurality of injection holes; and the at least one specific flat injection hole satisfies a relationship of R2<R1<R3, where:

R1 denotes the first curvature radius;

R2 denotes the second curvature radius; and

R3 denotes a third curvature radius that is a radius of curvature of another segment of the one end portion of the outlet opening directed in the axial direction of the long axis while the another segment of the one end portion of the outlet opening is located at an other-side wall section of the inner wall, which is located on an opposite side of the long axis that is opposite to the one-side wall section which guides the fuel at the fuel injection time.

2. The fuel injection valve according to claim 1, wherein the plurality of injection holes are a plurality of specific flat injection holes, and the at least one specific flat injection hole is one of the plurality of specific flat injection holes.

3. The fuel injection valve according to claim 1, wherein the curvature radius ratio of the at least one specific flat injection hole is in a range of 50% to 90%.

4. The fuel injection valve according to claim 1, wherein in the at least one specific flat injection hole, a portion of the other-side wall section progressively approaches the injection hole axis in a direction that is directed from the inlet opening toward the outlet opening.

5. The fuel injection valve according to claim 1, wherein a length of each of the at least two specific flat injection holes that is largest among the plurality of injection holes as measured along respective injection hole axes is larger than that of the other injection holes.

* * * * *